(12) United States Patent
Linna et al.

(10) Patent No.: US 7,032,576 B2
(45) Date of Patent: Apr. 25, 2006

(54) CAPILLARY HEATING CONTROL AND FAULT DETECTION SYSTEM AND METHODOLOGY FOR FUEL SYSTEM IN AN INTERNAL COMBUSTION ENGINE

(75) Inventors: Jan-Roger Linna, Boston, MA (US); John Paul Mello, Belmont, MA (US)

(73) Assignee: Philip Morris USA Inc., Richmond, VA (US)

(*) Notice: Subject to any disclaimer, the term of this patent is extended or adjusted under 35 U.S.C. 154(b) by 0 days.

(21) Appl. No.: 10/410,957

(22) Filed: Apr. 10, 2003

(65) Prior Publication Data
US 2004/0003801 A1    Jan. 8, 2004

Related U.S. Application Data

(63) Continuation-in-part of application No. 10/284,180, filed on Oct. 31, 2002, now Pat. No. 6,913,004, which is a continuation-in-part of application No. 10/143,250, filed on May 10, 2002, now Pat. No. 6,779,513.

(51) Int. Cl.
    *F02B 33/00*    (2006.01)
(52) U.S. Cl. ..................................... 123/549
(58) Field of Classification Search ........ 123/543–557, 123/198 D; 219/504–505, 552–553; 239/135–136
See application file for complete search history.

(56) References Cited

U.S. PATENT DOCUMENTS

| 3,716,416 A | 2/1973 | Adlhart et al. |
|---|---|---|
| 3,868,939 A | 3/1975 | Friese et al. |
| 3,933,135 A | 1/1976 | Zillman et al. |
| 3,999,525 A | 12/1976 | Stumpp et al. |
| 4,210,103 A | 7/1980 | Dimitroff et al. |

(Continued)

FOREIGN PATENT DOCUMENTS

DE    482591    2/1930

(Continued)

OTHER PUBLICATIONS

Boyle et al., "Cold Start Performance of an Automobile Engine Using Prevaporized Gasoline" SAE Technical Paper Series, Society of Automotive Engineers. vol. 102, No. 3, pp 949-957 (1993).

(Continued)

*Primary Examiner*—Marguerite McMahon
(74) *Attorney, Agent, or Firm*—Roberts, Mlotkowski & Hobbes

(57) ABSTRACT

A fuel system for use in an internal combustion engine includes a plurality of fuel injectors, each injector including at least one capillary flow passage, the at least one capillary flow passage having an inlet end and an outlet end, a heat source arranged along the at least one capillary flow passage, the heat source operable to heat a liquid fuel in the at least one capillary flow passage to a level sufficient to convert at least a portion thereof from the liquid state to a vapor state, and a valve for metering fuel to the internal combustion engine, a controller to control the power supplied to the heat source of each of the plurality of fuel injectors to achieve a predetermined target temperature, a sensor for use in determining engine air flow and a sensor for measuring a value indicative of degree of engine warm-up of the internal combustion engine. The fuel system of the present invention also provides fault detection capabilities with respect to malfunctions within the capillary flow passage.

7 Claims, 14 Drawing Sheets

U.S. PATENT DOCUMENTS

| | | | |
|---|---|---|---|
| 4,223,652 A | 9/1980 | Budnicki | |
| 4,344,402 A | 8/1982 | Child et al. | |
| 4,345,569 A | 8/1982 | Hattori et al. | |
| 4,403,576 A | 9/1983 | Dimitroff et al. | |
| 4,458,655 A | 7/1984 | Oza | |
| 4,870,932 A | 10/1989 | Asmus | |
| 4,886,032 A | 12/1989 | Asmus | |
| 4,955,351 A | 9/1990 | Lewis et al. | |
| 5,195,477 A | 3/1993 | Hudson, Jr. et al. | |
| 5,226,400 A | 7/1993 | Birch | |
| 5,331,937 A | 7/1994 | Clarke | |
| 5,332,046 A | 7/1994 | Tanimizu et al. | |
| 5,343,848 A | 9/1994 | Birch et al. | |
| 5,482,023 A | 1/1996 | Hunt et al. | |
| 5,524,582 A | 6/1996 | Suh et al. | |
| 5,529,035 A | 6/1996 | Hunt et al. | |
| 5,758,826 A | 6/1998 | Nines | |
| 5,813,388 A | 9/1998 | Cikanek, Jr. et al. | |
| 5,836,289 A | 11/1998 | Thring | |
| 5,850,822 A | 12/1998 | Romann et al. | 123/549 |
| 5,894,832 A | 4/1999 | Nogi et al. | |
| 5,947,091 A | 9/1999 | Krohn et al. | |
| 6,067,970 A | 5/2000 | Awarzamani et al. | |
| 6,067,971 A | 5/2000 | Cikanek, Jr. et al. | |
| 6,102,303 A | 8/2000 | Bright et al. | |
| 6,109,247 A | 8/2000 | Hunt | |
| 6,189,518 B1 | 2/2001 | Cooke | |
| 6,189,803 B1 | 2/2001 | Ganan-Calvo | |
| 6,234,153 B1 | 5/2001 | DeGroot et al. | |
| 6,237,576 B1 | 5/2001 | Buccino et al. | |
| 6,276,347 B1 | 8/2001 | Hunt | |
| 6,332,457 B1 | 12/2001 | Imoehl | |
| 6,354,256 B1 | 3/2002 | Ohanian et al. | |
| 6,390,076 B1 | 5/2002 | Hunt | |
| 6,779,513 B1 * | 8/2004 | Pellizzari et al. | 123/549 |
| 2001/0020469 A1 | 9/2001 | Hunt | |
| 2003/0178009 A1 | 9/2003 | Pellizzari et al. | 123/549 |
| 2003/0178010 A1 | 9/2003 | Pellizzari et al. | 123/549 |
| 2003/0178011 A1 | 9/2003 | Pellizzari et al. | 123/549 |

FOREIGN PATENT DOCUMENTS

| | | |
|---|---|---|
| DE | 19546851 | 6/1997 |
| DE | 199 52 344 | 5/2001 |
| EP | 0 485 610 A1 | 5/1992 |
| EP | 0915248 | 5/1999 |
| EP | 1 239 134 A2 | 9/2002 |
| GB | 1 483 408 | 8/1977 |
| JP | 5-141329 | 6/1993 |
| WO | WO 87/00887 | 2/1987 |
| WO | WO 00/19087 | 4/2000 |
| WO | WO 2004/042217 | 5/2004 |

OTHER PUBLICATIONS

English abstract of JP 2000 110666.
English abstract of DE 19546851.
English abstract of EP 0,915,248.
"Linear 02 Sensor" Bosch Automotive Handbook, vol. 5, 2000, pp. 117-118, XP002286592.
Patent Abstracts of Japan vol. 0175, No. 30[M-1485], Sep. 24, 1993.

* cited by examiner

CAPILLARY HEATING CONTROL AND FAULT DETECTION SYSTEM AND METHODOLOGY FOR FUEL SYSTEM IN AN INTERNAL COMBUSTION ENGINE

RELATED APPLICATION

This patent application is a continuation-in-part of application Ser. No. 10/284,180, filed on Oct. 31, 2002 now U.S. Pat. No. 6,913,004 directed to a FUEL SYSTEM FOR AN INTERNAL COMBUSTION ENGINE AND METHOD FOR CONTROLLING SAME, which is a continuation-in-part of application Ser. No. 10/143,250, filed on May 10, 2002, now U.S. Pat. No. 6,779,513 directed to a FUEL INJECTOR FOR AN INTERNAL COMBUSTION ENGINE, which are hereby incorporated by reference.

FIELD

The present invention relates to fuel delivery in an internal combustion engine.

BACKGROUND

In light of the evermore stringent emissions regulations that are planned to take effect over the next few years, including California Low Emission Vehicle II (LEV II), Federal USA EPA Tier 2 and European Union EU-IV, pre-catalyst engine-out HC emissions, especially during cold start and warm-up, are attracting significant efforts in research and development. This is due in large part to the fact that as much as 80 percent of the total hydrocarbon emissions produced by a typical, modern light-duty vehicle during the Federal Test Procedure (FTP) can occur during the first 120 seconds of the test.

These high levels of emissions are largely attributable to cold engine and exhaust component temperatures. Specifically, cold engine components necessitate fuel-rich operation, in which the excess fuel is used to compensate for the portion of fuel that has attached to the walls of the intake system and combustion chamber and, thus, is not readily combusted. In addition, a cold three-way catalyst cannot reduce a significant amount of the unburned hydrocarbons that pass through the engine during cold-start. As a result, high concentrations of unburned hydrocarbons are emitted from the tailpipe. It is understood that the over-fueling associated with excessive hydrocarbon emissions during cold-start could be eliminated through the use of gasoline vapor rather than liquid gasoline.

A variety of systems have been devised to supply fine liquid fuel droplets and air to internal combustion engines that work relatively well after engine warm-up. These systems either supply fuel directly into the combustion chamber (direct injection) or utilize a carburetor or fuel injector(s) to supply the mixture through an intake manifold into a combustion chamber (indirect injection). In currently employed systems, the fuel-air mixture is produced by atomizing a liquid fuel and supplying it as fine droplets into an air stream.

In conventional spark-ignited engines employing port-fuel injection, the injected fuel is vaporized by directing the liquid fuel droplets at hot components in the intake port or manifold. Under normal operating conditions, the liquid fuel films on the surfaces of the hot components and is subsequently vaporized. The mixture of vaporized fuel and intake air is then drawn into the cylinder by the pressure differential created as the intake valve opens and the piston moves towards bottom dead center. To ensure a degree of control that is compatible with modern engines, this vaporizing technique is typically optimized to occur in less than one engine cycle.

Under most engine operating conditions, the temperature of the intake components is sufficient to rapidly vaporize the impinging liquid fuel droplets. However, as indicated, under conditions such as cold-start and warm-up, the fuel is not vaporized through impingement on the relatively cold engine components. Instead, engine operation under these conditions is ensured by supplying excess fuel such that a sufficient fraction evaporates through heat and mass transfer as it travels through the air prior to impinging on a cold intake component. Evaporation rate through this mechanism is a function of fuel properties, temperature, pressure, relative droplet and air velocities and droplet diameter. Of course, this approach breaks down in extreme ambient cold-starts, in which the fuel volatility is insufficient to produce vapor in ignitable concentrations with air.

In order for combustion to be chemically complete, the fuel-air mixture must be vaporized to a stoichiometric or fuel-lean gas-phase mixture. A stoichiometric combustible mixture contains the exact quantities of air (oxygen) and fuel required for complete combustion. For gasoline, this air-fuel ratio is about 14.7:1 by weight. A fuel-air mixture that is not completely vaporized, or is rich or overly lean, results in incomplete combustion and reduced thermal efficiency. The products of an ideal combustion process are water ($H_2O$) and carbon dioxide ($CO_2$). If combustion is incomplete, some carbon is not fully oxidized, yielding carbon monoxide (CO) and unburned hydrocarbons (HC).

The mandate to reduce air pollution has resulted in attempts to compensate for combustion inefficiencies with a multiplicity of fuel system and engine modifications. As evidenced by the prior art relating to fuel preparation and delivery systems, much effort has been directed to reducing liquid fuel droplet size, increasing system turbulence and providing sufficient heat to vaporize fuels to permit more complete combustion.

Given the relatively large proportion of unburned hydrocarbons emitted during startup, this aspect of light duty vehicle engine operation has been the focus of significant technology development efforts. Furthermore, as increasingly stringent emissions standards are enacted into legislation and consumers remain sensitive to pricing and performance, these development efforts will continue to be paramount. One general class of solutions employed to reduce engine startup emissions involves fuel vaporization. Key practical challenges to providing vaporized fuel include the fact that metering fuel vapor is problematic, and thus most approaches to reducing cold-start emissions focus on metering the fuel as a liquid and then vaporizing it. Heated fuel injector concepts with fuel heaters or vaporizers added on at the outlet of the injector generally suffer from poor atomization and fuel targeting once the heater is turned off. In addition, heated injector and heated impingement plates suffer from an intrinsic design challenge between minimizing the power required to the heating element and minimizing the vaporizer warm-up time. For practical purposes the heating time associated with both heated injectors and heated impingement plates are too long unless excessive electrical power is supplied.

One particular solution to the aforementioned difficulties associated with fuel vaporization implementations involves the use of capillary channels to vaporize fuel. The use of capillary channels offers a number of distinct advantages over other techniques that are directed at supplying vaporized fuel to internal combustion engines. In particular, the high surface area to volume ratio of the capillary channel combined with the relatively low thermal mass of the capillary structure results in fast warm up times (on the order of less than 0.5 seconds) and minimal power requirements (on the order of 150 watts per cylinder) necessary to achieve the desired heating profile. Yet another advantage of capillary channels in connection with fuel vaporization is the fact that the capillary design can be integrated with the functionality of a conventional fuel injector such that a single injector can supply both liquid and vaporized fuel, depending upon the selected emission control strategy.

One form of a capillary channel-based fuel vaporizer is disclosed in U.S. patent application Ser. No. 10/284,180, filed on Oct. 31, 2002, such patent application being the patent application upon which this patent application is based. In that application, a fuel system for use in an internal combustion engine is disclosed and a preferred form includes a plurality of fuel injectors, each injector including (i) at least one capillary flow passage, the at least one capillary flow passage having an inlet end and an outlet end, (ii) a heat source arranged along the at least one capillary flow passage, the heat source operable to heat a liquid fuel in the at least one capillary flow passage to a level sufficient to convert at least a portion thereof from the liquid state to a vapor state, and (iii) a valve for metering fuel to the internal combustion engine, the valve located proximate to the outlet end of the at least one capillary flow passage, a liquid fuel supply system in fluid communication with the plurality of fuel injectors, a controller to control the power supplied to the heat source of each of the plurality of fuel injectors to achieve a predetermined target temperature, the predetermined target temperature operable to convert a portion of liquid fuel to the vapor state; means for determining engine air flow of the internal combustion engine, and a sensor for measuring a value indicative of degree of engine warm-up of the internal combustion engine, the sensor operatively connected to the controller; and wherein the portion of liquid fuel to be converted to the vapor state is controlled with reference to sensed internal combustion engine conditions to achieve minimal exhaust emissions.

The fuel system disclosed in the patent application upon which this patent application is based is effective in reducing cold-start and warm-up emissions of an internal combustion engine. Efficient combustion is promoted by forming an aerosol of fine droplet size when the substantially vaporized fuel condenses in air. The vaporized fuel can be supplied to a combustion chamber of an internal combustion engine during cold-start and warm-up of the engine and reduced emissions can be achieved.

The patent application upon which this patent is based also discloses a method for controlling the fuel system and delivering fuel to an internal combustion engine for a fuel system including at least one fuel injector having at least one capillary flow passage, a heat source arranged along the at least one capillary flow passage, the heat source capable of heating a liquid fuel in the at least one capillary flow passage to a level sufficient to convert at least a portion thereof from the liquid state to a vapor state, and a valve for metering fuel to the internal combustion engine, the valve located proximate to an outlet end of the at least one capillary flow passage. The method includes the steps of determining engine air flow of the internal combustion engine, measuring a value indicative of degree of engine warm-up of the internal combustion engine, determining a portion of liquid fuel to be converted to the vapor state by the at least one capillary flow passage, the determining step employing the measured values, controlling power supplied to the heat source of the at least one fuel injector to achieve a predetermined target temperature, the predetermined target temperature operable to convert the portion of liquid fuel to the vapor state so determined and delivering the fuel to a combustion chamber of the internal combustion engine and wherein the portion of liquid fuel to be converted to the vapor state is determined to achieve minimal exhaust emissions.

According to one preferred form described in that patent application, the capillary flow passage can include a capillary tube and the heat source can include a resistance heating element or a section of the tube heated by passing electrical current therethrough. The fuel supply can be arranged to deliver pressurized or non-pressurized liquid fuel to the flow passage. The apparatus can provide a stream of vaporized fuel that mixes with air and forms an aerosol that can be carried by an air stream, regardless of the flow path, into the combustion chamber.

As further described in the patent application upon which this patent application is based, the target temperature of the capillary is determined through the use of a control algorithm designed to achieve an appropriate target setpoint. The target setpoint is the ratio of the hot resistance of the capillary to the cold (unheated) resistance of the capillary $(R/R_o)$. The ratio $R/R_o$, in turn, corresponds to a desired bulk capillary temperature.

Unfortunately, over time, the material properties of the capillaries may change as a result of various physical phenomena, including annealing of the capillary material and deposits buildup on the interior capillary walls. As a result of these changes, the value of $R_o$ (the cold, unheated resistance of the capillary) may change accordingly. As a result, the bulk capillary temperature that corresponds to a given value of $R/R_o$ may also change over time. Left unaddressed, sub-optimal operating characteristics may result. These include situations in which (i) insufficient heat is supplied to the capillary resulting in poor fuel vaporization; (ii) insufficient heat is supplied to the capillary resulting in no fuel vaporization; (iii) the capillary is overheated resulting in an increased power requirement with respect to the capillary; and (iv) the capillary is overheated which may result in mechanical failure of the capillary including melting, cracking or breaking.

These failures are undesirable for a number of obvious reasons. In addition, the California Air Resources Board (CARB) mandates that for 2007, emissions related components are required to operate properly for at least 150,000 miles. This is well beyond the range at which such a failure resulting from natural capillary material changes may occur unless capillary heat is carefully controlled in response to the physical material changes in the capillaries.

Further, as per CARB and EPA mandates, any faults in the operation of the fuel injector must be detectable by the On-Board Diagnostics-II (OBD-II) system of the vehicle. Unfortunately, it has been in the past for various reasons, difficult to comply with vehicle OBD-II requirements in a way that is inexpensive to implement and in which the solution remains robust throughout the life of the component.

Proper operation of the capillary channel based fuel injector discussed above, in a situation when no heat is supplied to the capillary (i.e. operation as a conventional fuel injector) during fully warmed engine conditions, is inherently detectable through modern vehicle architectures that employ electronic fuel injection, electronic engine control (EEC), and exhaust gas oxygen sensors. The duty cycle of the electronic fuel injector, as requested by the EEC, provides an indication of the target amount of fuel that should be supplied to the engine. The exhaust gas oxygen sensor(s) provide an indication of the fuel that actually has been supplied by the injectors to the engine. Thus a straightforward OBD-II check of the conventional fuel injector operation may be based upon a comparison of the fuel injector duty cycle and the signal from the exhaust gas oxygen sensor.

While operational status is readily detectible in the non-heated mode of the capillary channel-based injector, operational fault detection is not as straightforward in the case where the capillary is being heated. Since the volumetric flow rate of the fuel varies with temperature the above discussed fault detection scheme does not work during operational modes in which the capillary is being heated to some degree.

OBJECTS AND SUMMARY OF THE PREFERRED FORMS

Based upon the above, there is a need for a robust method and system that accounts for the variation in and/or degradation of capillary physical characteristics such that capillary temperature may be accurately controlled over time and in response to natural physical changes in the capillary material.

One object of the present invention is thus to provide a fuel system having improved fuel vaporization characteristics under most engine operating conditions, particularly cold-start and warm-up conditions.

Another object is to provide a fuel injector and delivery system capable of reducing emissions and improving fuel efficiency.

It is a still further object to provide a fuel injector and delivery system that can supply vaporized fuel while requiring minimal power and warm-up time, without the need for a high pressure fuel supply system.

It is an even further object of the present invention to provide such an improved fuel system using capillary channels for vaporization.

It is a still further object of the present invention to provide a fuel system using capillary channels in which capillary temperature can be accurately controlled over time and in response to physical changes to the capillary material that occur over time.

Yet a still further object of the present invention is to provide a system and a methodology through which fuel injector operational faults may be detected during heating of the capillary section for vaporized fuel delivery.

It is an even further object of the present invention to provide such fault detection capability in a way that is consistent with OBD-II requirements for modern vehicles.

These and other objects will become apparent from the detailed description of the preferred forms set out below and now summarized as follows:

BRIEF DESCRIPTION OF THE DRAWINGS

The invention will now be described in more detail with reference to preferred forms of the invention, given only by way of example, and with reference to the accompanying drawings, in which.

DETAILED DESCRIPTION OF THE PREFERRED EMBODIMENTS

Figure 1:
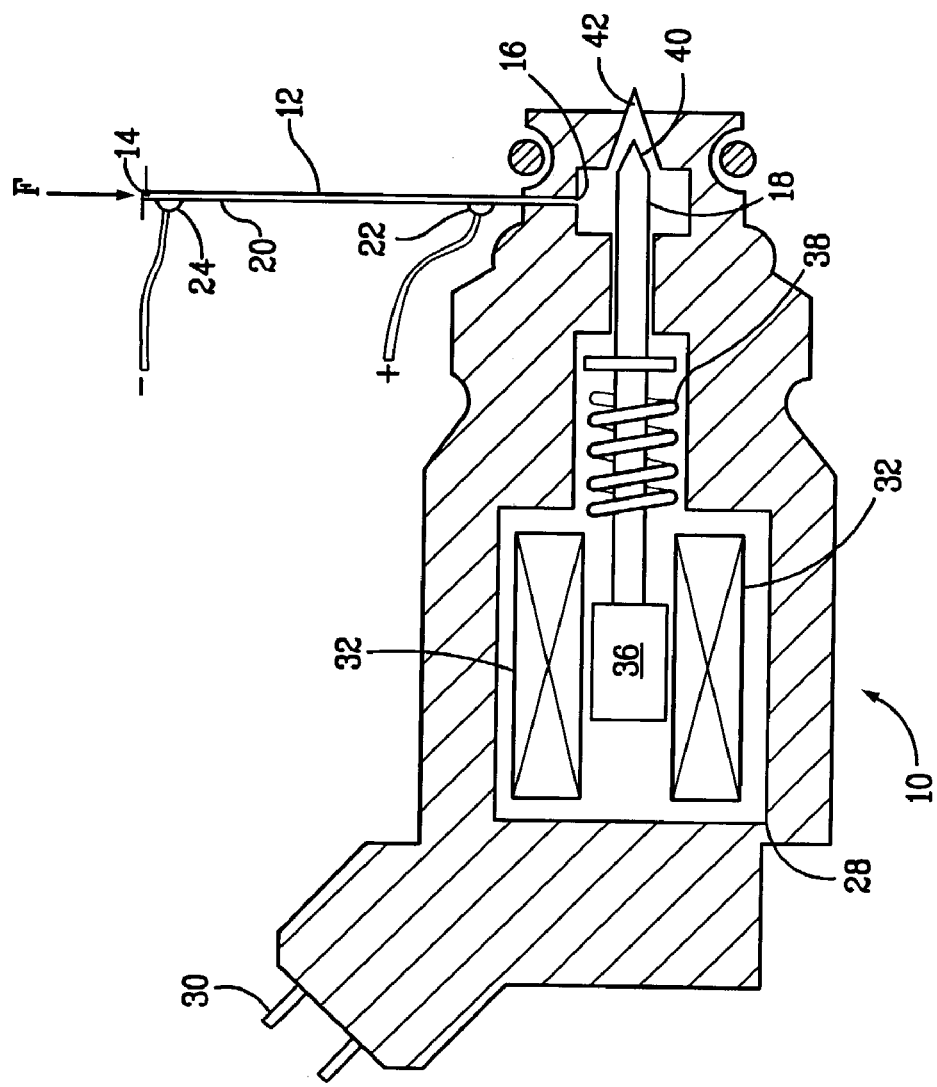
FIG. 1 illustrates an in-line-heated injector having an electrically heated capillary, in partial cross section, incorporated upstream of a modified conventional side-fed port fuel injector, in accordance with a preferred form.

Reference is now made to the embodiments illustrated in FIGS. 1–14 wherein like numerals are used to designate like parts throughout.

Provided is a fuel system and method for its control that is useful for cold-start, warm-up and normal operation of an internal combustion engine. The fuel system includes a fuel injector having a capillary flow passage, capable of heating liquid fuel so that substantially vaporized fuel is supplied into an engine cylinder. The substantially vaporized fuel can be combusted with reduced emissions compared to conventional fuel injector systems. Furthermore, the fuel system requires less power, and has shorter warm-up times than other vaporization techniques.

In general, gasolines do not readily vaporize at low temperatures. During the cold start and warm-up period, relatively little vaporization of the liquid fuel takes place. As such, it is necessary to provide an excess of liquid fuel to each cylinder of the engine in order to achieve an air/fuel mixture that will combust. Upon ignition of the fuel vapor, which is generated from the excess of liquid fuel, combustion gases discharged from the cylinders include unburned fuel and undesirable gaseous emissions. However, upon reaching normal operating temperature, the liquid fuel readily vaporizes, so that less fuel is needed to achieve an air/fuel mixture that will readily combust. Advantageously, upon reaching normal operating temperature, the air/fuel mixture can be controlled at or near stoichiometric ratio, thereby reducing emissions of unburned hydrocarbons and carbon monoxide. Additionally, when fueling is controlled at or near stoichiometric ratio, just enough air is available in the exhaust stream for simultaneous oxidation of unburned hydrocarbons and carbon monoxide and reduction of nitrogen oxides over a three-way catalyst (TWC).

The system and method of the present invention injects fuel that has been substantially vaporized into the intake flow passage, or directly into an engine cylinder, thereby eliminating the need for excess fuel during the start-up and warm-up period of an engine. The fuel is preferably delivered to the engine in a stoichiometric or fuel-lean mixture, with air, or air and diluent, so that virtually all of the fuel is burned during the cold start and warm-up period.

With conventional port-fuel injection, over-fueling is required to ensure robust, quick engine starts. Under fuel-rich conditions, the exhaust stream reaching the three-way catalyst does not contain enough air to oxidize the excess fuel and unburned hydrocarbons as the catalyst warms up. One approach to address this issue is to utilize an air pump to supply additional air to the exhaust stream upstream of the catalytic converter. The objective is to generate a stoichiometric or slightly fuel-lean exhaust stream, which can react over the catalyst surface once the catalyst reaches its light-off temperature. In contrast, the system and method of the present invention enables the engine to operate at stoichiometric or even slightly fuel-lean conditions during the cold-start and warm-up period, eliminating both the need for over-fueling and the need for an additional exhaust air pump, reducing the cost and complexity of the exhaust after treatment system.

Another approach to address catalyst warm-up during the cold start and warm-up period, is to deliberately operate the engine very fuel-rich during this period. Using an exhaust air-pump to supply air in this fuel-rich exhaust stream, a combustible mixture can be generated which is burned either by auto-ignition or by some ignition source upstream of, or in, the catalytic converter. The exotherm produced by this oxidation process significantly heats up the exhaust gas and the heat is largely transferred to the catalytic converter as the exhaust passes through the catalyst. Using the system and method of the present invention, the engine could be controlled to operate alternating cylinders fuel-rich and fuel-lean to achieve the same effect but without the need for an air pump. For example, with a four-cylinder engine, two cylinders could be operated fuel-rich during the cold-start and warm-up period to generate unburned hydrocarbons in the exhaust. The two remaining cylinders would be operated fuel-lean during cold-start and warm-up, to provide oxygen in the exhaust stream.

A fuel system according to the invention includes at least one capillary-sized flow passage through which pressurized fuel flows before being injected into an engine for combustion. A capillary-sized flow passage can be provided with a hydraulic diameter that is preferably less than 2 mm, more preferably less than 1 mm, and most preferably less than 0.5 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

Heat is applied along the capillary passageway, resulting in at least a portion of the liquid fuel that enters the flow passage being converted to a vapor as it travels along the passageway. The fuel exits the capillary passageway substantially as a vapor, which optionally contains a minor proportion of heated liquid fuel, which has not been vaporized. By substantially vaporized, it is meant that at least 50% of the volume of the liquid fuel is vaporized by the heat source, more preferably at least 70%, and most preferably at least 80% of the liquid fuel is vaporized. Although it may be difficult to achieve 100% vaporization due to complex physical effects that take place, nonetheless complete vaporization would be desirable. These complex physical effects include variations in the boiling point of the fuel since the boiling point is pressure dependent and pressure can vary in the capillary flow passage. Thus, while it is believed that a major portion of the fuel reaches the boiling point during heating in the capillary flow passage, some of the liquid fuel may not be heated enough to be fully vaporized with the result that a portion of the liquid fuel passes through the outlet of the capillary flow passage along with the vaporized fluid.

The capillary-sized fluid passage is preferably formed in a capillary body such as a single or multilayer metal, ceramic or glass body. The passage has an enclosed volume opening to an inlet and an outlet either of which, or both, may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body. The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage, which can be $8\times10^{-5}$ to $7$ mm$^2$, preferably $8\times10^{-3}$ to $8\times10^{-1}$ mm$^2$ and more preferably $2\times10^{-2}$ to $2\times10^{-1}$ mm$^2$. Many combinations of a single or multiple capillaries, various pressures, various capillary lengths, amounts of heat applied to the capillary, and different cross-sectional areas will suit a given application.

The liquid fuel can be supplied to the capillary flow passage under a pressure of at least 10 psig, preferably at least 20 psig. In the case where the capillary flow passage is defined by the interior of a stainless steel tube having an internal diameter of approximately 0.020 inch and a length of approximately 6 inches, the fuel is preferably supplied to the capillary passageway at a pressure of 100 psig or less to achieve mass flow rates required for stoichiometric start of a typical size automotive engine cylinder (on the order of 100–200 mg/s). The at least one capillary passageway provides a sufficient flow of substantially vaporized fuel to ensure a stoichiometric or nearly stoichiometric mixture of fuel and air that can be ignited and combusted within the cylinder(s) of an engine without producing undesirably high levels of unburned hydrocarbons or other emissions. The capillary tube also is characterized by having a low thermal inertia, so that the capillary passageway can be brought up to the desired temperature for vaporizing fuel very quickly, preferably within 2.0 seconds, more preferably within 0.5 second, and most preferably within 0.1 second, which is beneficial in applications involving cold starting an engine.

During vaporization of liquid fuel in a heated capillary passage, deposits of carbon and/or heavy hydrocarbons can accumulate on the capillary walls and the flow of the fuel can be severely restricted which ultimately can lead to clogging of the capillary flow passage. The rate at which these deposits accumulate is a function of capillary wall temperature, fuel flow rate and fuel type. It is believed that fuel additives may be useful in mitigating the formation of such deposits. However, should clogging develop, such clogging can be cleared by oxidizing the deposits.

FIG. 1 presents a fuel injector 10 for vaporizing a liquid fuel drawn from a source of liquid fuel, in accordance with the present invention. Apparatus 10 includes a capillary flow passage 12, having an inlet end 14 and an outlet end 16, inlet end 14 in fluid communication with a liquid fuel source F for introducing the liquid fuel in a substantially liquid state into capillary flow passage 12.

As is preferred, a needle valve assembly 18 is operated by solenoid 28. Solenoid 28 has coil windings 32 connected to electrical connector 30. When the coil windings 32 are energized, the solenoid element 36 is drawn into the center of coil windings 32. When electricity is cut off from the coil windings 32, a spring 38 returns the solenoid element to its original position. A needle 40 is connected to the solenoid element 36. Movement of the solenoid element 36, caused by applying electricity to the coil windings 32, causes the needle 40 to be drawn away from an orifice 42 allowing fuel to flow through the orifice 42.

A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from a liquid state to a vapor state and deliver a stream of substantially vaporized fuel from outlet end 16 of capillary flow passage 12.

The heated capillary flow passage 12, in accordance with the invention can produce a vaporized stream of fuel, which condenses in air to form a mixture of vaporized fuel, fuel droplets, and air commonly referred to as an aerosol. Compared to a conventional automotive port-fuel injector, which delivers a fuel spray comprised of droplets in the range of 100 to 300 μm Sauter Mean Diameter (SMD), the aerosol has an average droplet size of less than 25 μm SMD, preferably less than 15 μm SMD. Thus, the majority of the fuel droplets produced by the heated capillary according to the invention can be carried by an air stream, regardless of the flow path, into the combustion chamber.

The difference between the droplet size distributions of a conventional injector and the heated capillary flow passage according to the invention is particularly critical during cold-start and warm-up conditions. Specifically, using a conventional port-fuel injector, relatively cold intake manifold components necessitate over-fueling such that a sufficient fraction of the large fuel droplets, impinging on the intake components, are evaporated to produce an ignitable fuel/air mixture. Conversely, the vaporized fuel and fine droplets produced by the fuel injector of the present invention are essentially unaffected by the temperature of engine components upon start-up and, as such, eliminate the need for over-fueling during engine start-up conditions. The elimination of over-fueling combined with more precise control over the fuel/air ratio to the engine afforded through the use of the heated capillary injector of the present invention results in greatly reduced cold start emissions compared to those produced by engines employing conventional fuel injector systems. In addition to a reduction in over-fueling, it should also be noted that the heated capillary injector according to the invention further enables fuel-lean operation during cold-start and warm-up, which results in a greater reduction in tailpipe emissions while the catalytic converter warms up.

Referring still to FIG. 1, capillary flow passage 12 can comprise a metal tube such as a stainless steel capillary tube and the heater comprising a length of the tube 20 through which electrical current is passed. In a preferred embodiment, the capillary tube is provided with an internal diameter of approximately 0.02 to 0.03 inches, a heated length of approximately 1 to 10 inches, and fuel can be supplied to the tube 12 at a pressure of less than 100 psig, preferably less than 70 psig, more preferably less than 60 psig and even more preferably less than 45 psig. It has been shown that this embodiment produces vaporized fuel, which forms a distribution of aerosol droplets, which mostly range in size from 2 to 30 μm SMD with an average droplet size of about 5 to 15 μm SMD, when the vaporized fuel is condensed in air at ambient temperature. The preferred size of fuel droplets to achieve rapid and nearly complete vaporization at cold-starting temperatures is less than about 25 μm. This result can be achieved by applying approximately 100 to 400 W, e.g., 200 W of electrical power, which corresponds to 2–3% of the energy content of the vaporized fuel, to a six-inch stainless steel capillary tube. The electrical power can be applied to the capillary tube by forming the tube entirely from an electrically conductive material such as stainless steel, or by providing a conductive material over at least a portion of a non-electrically conducting tube or laminate having a flow passage therein such as by laminating or coating an electrically resistive material to form a resistance heater on the tube or laminate. The resistive component of the capillary is chosen based on the material's temperature coefficient of resistance. The temperature of the material can be controlled by applying power to achieve a target resistance. Electrical leads can be connected to the electrically conductive material to supply the electrical current to the heater so as to heat the tube along its length. Alternatives for heating the tube along its length could include inductive heating, such as by an electrical coil positioned around the flow passage, or other sources of heat positioned relative to the flow passage to heat the length of the flow passage through one or a combination of conductive, convective or radiative heat transfer.

Although a preferred capillary tube has a heated length of approximately 6 inches and an internal diameter of approximately 0.020 inches, other configurations of capillaries provide acceptable vapor quality. For example, the internal diameter can range from 0.02 to 0.03 inch and the heated portion of the capillary tube can range from 1 to 10 inches. After cold-start and warm-up, it is not necessary to heat the capillary tube such that the unheated capillary tube can be used to supply adequate liquid fuel to an engine operating at normal temperature.

The vaporized fuel exiting from the fuel capillary according to the invention can be injected into an engine intake manifold at the same location as existing port-fuel injectors or at another location along the intake manifold. If desired, however, the fuel capillary can be arranged to deliver vaporized fuel directly into each cylinder of the engine. The fuel capillary provides advantages over systems that produce larger droplets of fuel that must be injected against the back side of a closed intake valve while starting the engine. Preferably, the outlet of the fuel is capillary tube is positioned flush with the intake manifold wall similar to the arrangement of the outlets of conventional fuel injectors.

After approximately 20 seconds (or preferably less) from starting the engine, the power used to heat the capillary flow passage 12 can be turned off and liquid injection initiated using conventional fuel injectors, for normal engine operation. Normal engine operation can alternatively be performed by liquid fuel injection through an unheated capillary flow passage 12 via continuous injection or possibly pulsed injection.

Figure 2:
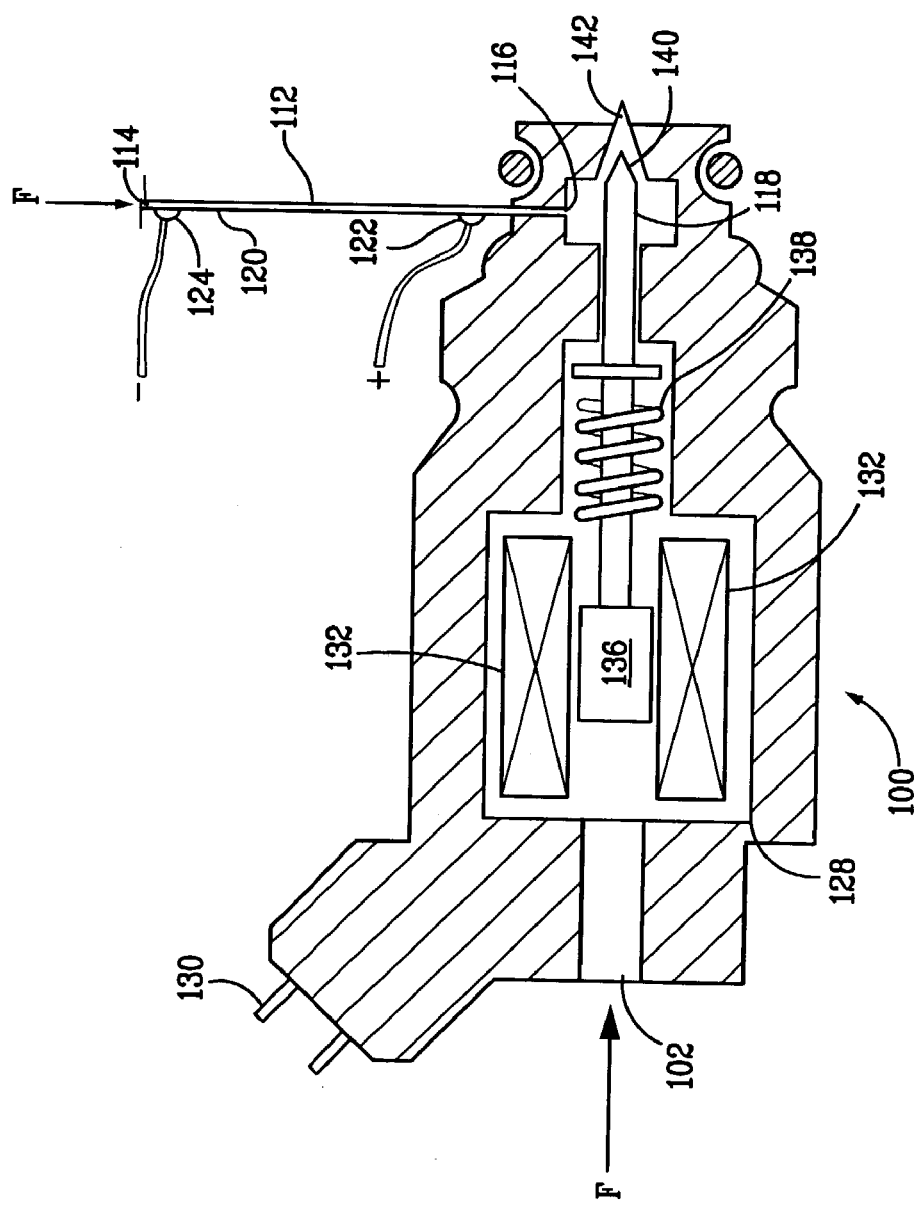
FIG. 2 presents another vapor-liquid in-line-heated injector having an electrically heated capillary, in partial cross section, capable of also providing a stream of liquid fuel according to another preferred form.

Referring to FIG. 2, a dual vapor/liquid fuel injector 100, in accordance with the present invention, is shown. Vapor/liquid fuel injector 100 includes a capillary flow passage 112, having an inlet end 114 and an outlet end 116, inlet end 114 in fluid communication with a liquid fuel source F for introducing the liquid fuel in a substantially liquid state into capillary flow passage 112 and liquid passage 102.

A needle valve assembly 118 is operated by solenoid 128 and is used to control the flow of fuel from capillary flow passage 112 and/or liquid passage 102. Solenoid 128 has coil windings 132 connected to electrical connector 130. When the coil windings 132 are energized, the solenoid element 136 is drawn into the center of coil windings 132. As previously described, when electricity is cut off from the coil windings 132, a spring 138 returns the solenoid element to its original position. A needle 140 is connected to the solenoid element 136. Movement of the solenoid element 136, caused by applying electricity to the coil windings 132, causes the needle 140 to be drawn away from an orifice 142 allowing fuel to flow through the orifice 142.

A heat source 120 is arranged along capillary flow passage 112. As is most preferred, heat source 120 is provided by forming capillary flow passage 112 from a tube of electrically resistive material, a portion of capillary flow passage 112 forming a heater element when a source of electrical current is connected to the tube at connections 122 and 124 for delivering current. Heat source 120, as may be appreciated, is then operable to heat the liquid fuel in capillary flow passage 112 to a level sufficient to change at least a portion thereof from a liquid state to a vapor state and deliver a stream of substantially vaporized fuel from outlet end 116 of capillary flow passage 112. After about 20 seconds from starting the engine, or preferably less, flow to the capillary flow passage 112 can be terminated and the conventional liquid passage 102 activated for continued operation of the engine.

Figure 3:
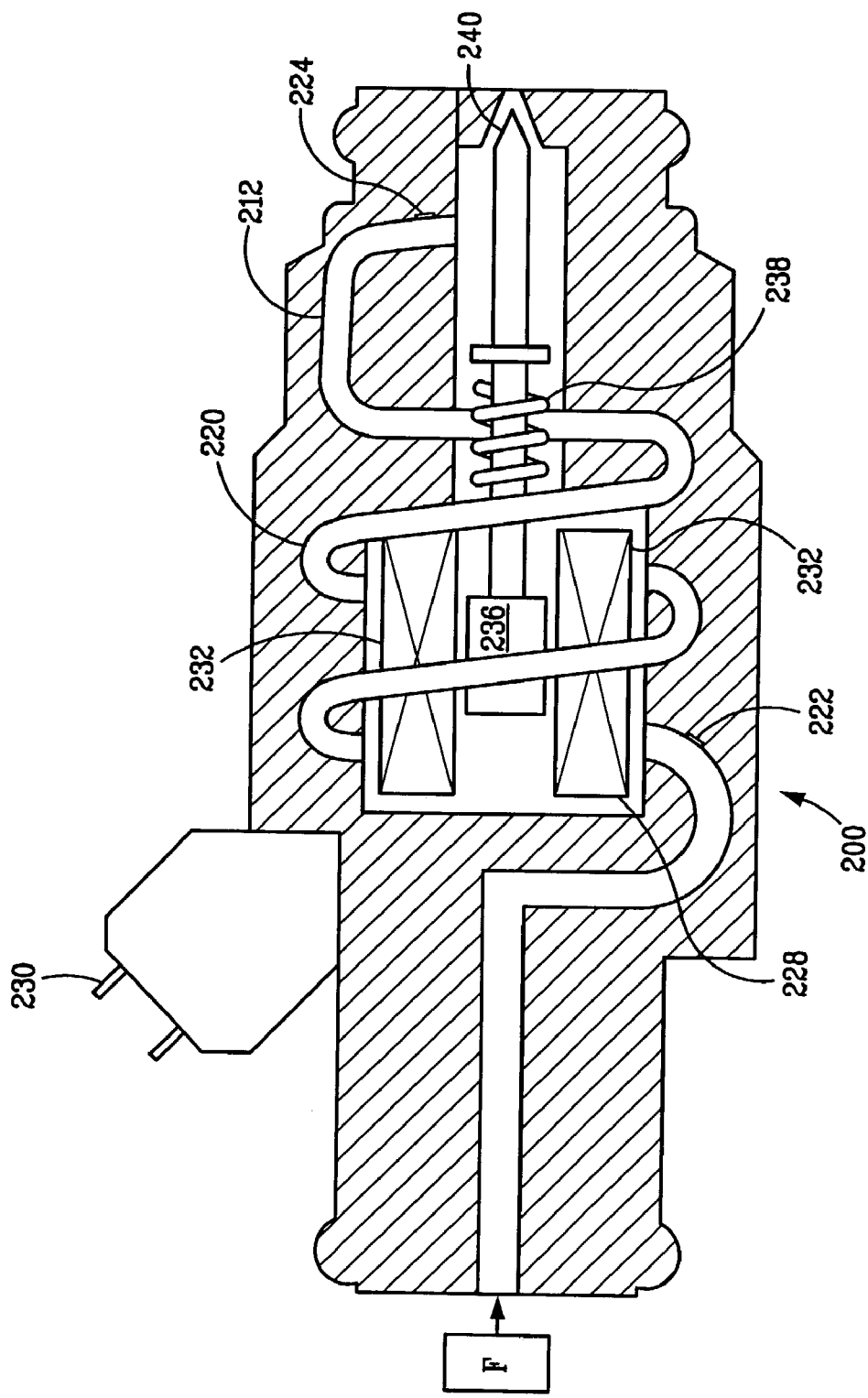
FIG. 3 is a cross-sectional view of another embodiment of the fuel injector according to yet another preferred form.

Referring now to FIG. 3, yet another exemplary embodiment of the present invention is shown. A fuel injector 200 has a non-linear (helical) heated capillary flow passage 212, which is coiled, within the interior of the fuel injector 200 as illustrated in FIG. 3. In this embodiment, the capillary flow passage 212 is coiled around the solenoid assembly 228 and is heated along heated length 220, defined by electrical connections 222 and 224. This embodiment is useful in a situation where space is limited and a linear capillary tube is not feasible. In addition, this embodiment could be adapted for use with a conventional fuel injector (see FIG. 4) for delivering fuel to an engine during normal operating conditions.

Figure 4:
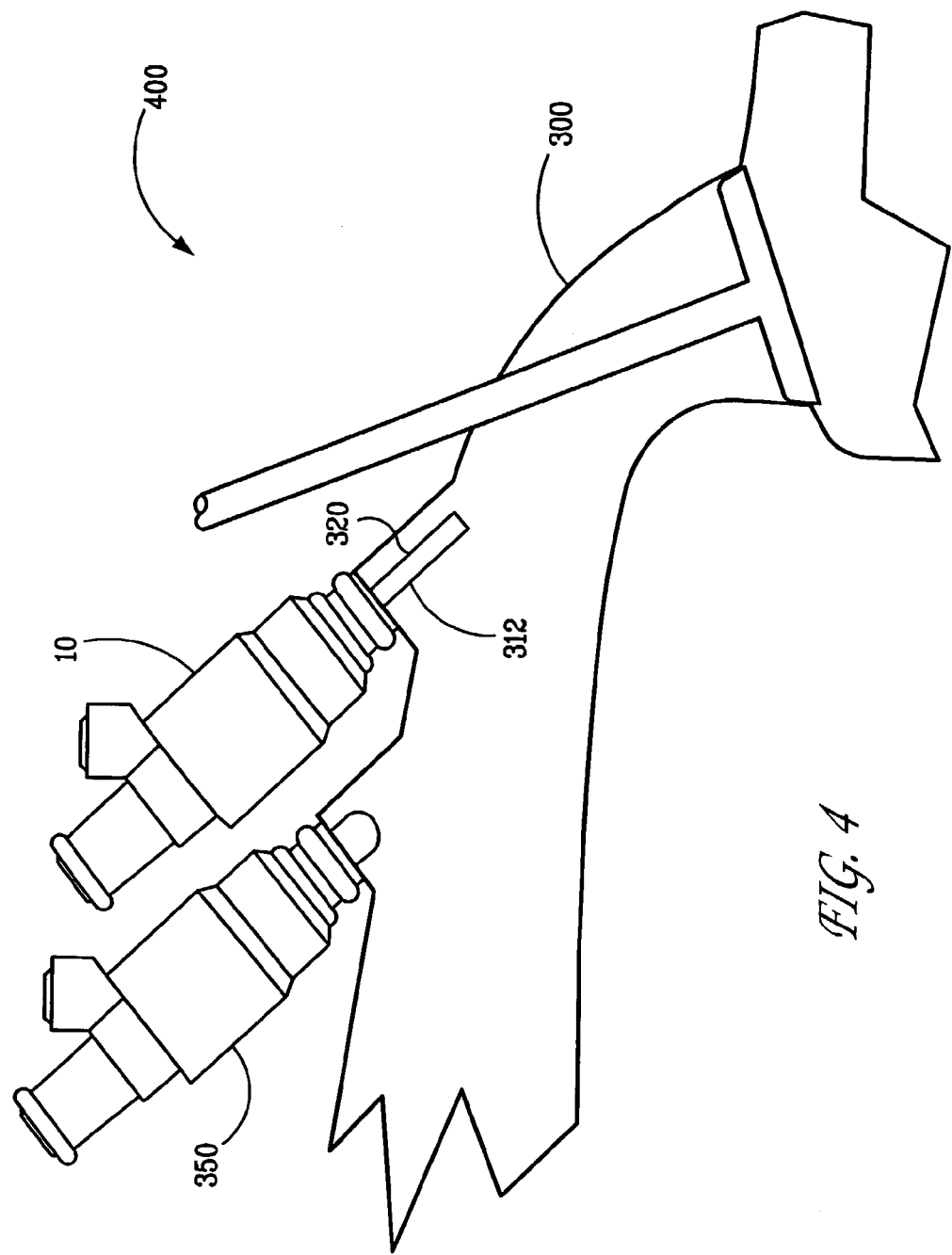
FIG. 4 is a side view of another embodiment employing dual injectors in accordance with still another preferred form.

Referring now to FIG. 4, an engine intake port 300 is fitted with a heated capillary injector 10 (of the type described with reference to FIG. 1) and a conventional liquid fuel injector 350. In this embodiment, fuel will be delivered to the engine by the capillary flow passage 312, heated along its length 320, during the cold-start and warm-up of the engine. After the first approximately 20 seconds from starting the engine, or preferably less, the heated capillary injector 10 will be deactivated and the conventional fuel injector 350 activated for normal operation of the engine.

Figure 5:
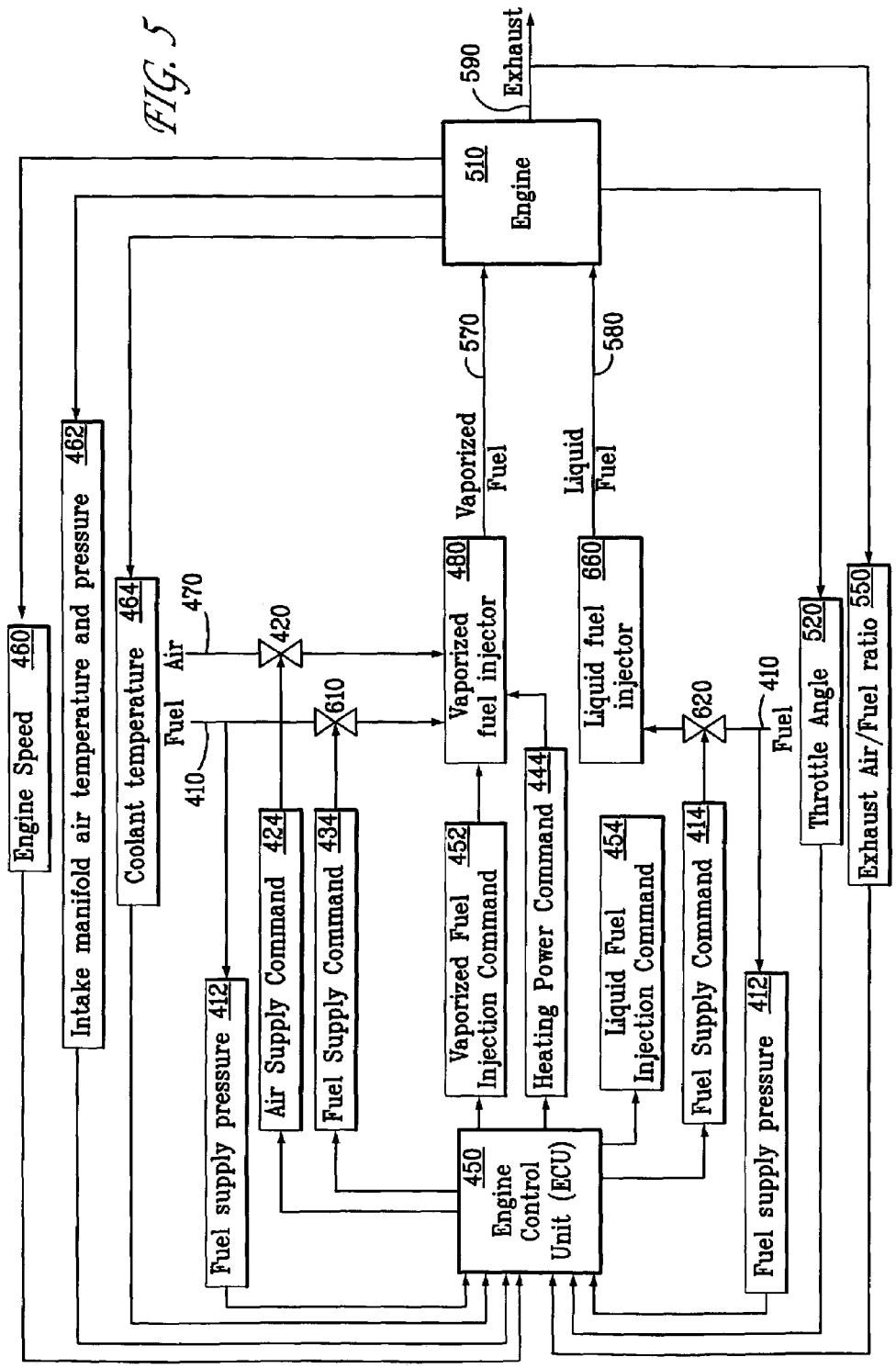
FIG. 5 is a schematic of a fuel delivery and engine/controller system in which a separate vapor fuel injector is used in conjunction with a conventional fuel injector.

As shown in FIG. 5, fuel delivery to a capillary flow passage can be effected by a controller 450. For example, the controller 450 can activate fuel delivery for a preset time period and deactivate fuel delivery after the preset amount of time. The controller 450 may also effect adjustment of the pressure of the liquid fuel and/or the amount of heat supplied to the capillary flow passage based on one or more sensed conditions, as will be explained below. The sensed conditions may is include inter alia: the fuel pressure 412, the capillary temperature, and the air fuel ratio 550. The controller 450 may also control multiple fuel delivery devices attached to the application. As will be appreciated by those skilled in the art, the controller 450 may also control one or more capillary flow passages to clear deposits. For example, cleaning of a capillary flow passage can be achieved by applying heat to the capillary flow passage and supplying a flow of an oxidant source to the capillary flow passage.

A capillary fuel injector, of the type shown in FIG. 1, may be used together with a conventional liquid fuel injector, as shown in FIG. 4, together with the control system shown in FIG. 5. FIG. 5 shows an exemplary schematic of a control system 400 used to operate an internal combustion engine 510 incorporating a liquid fuel supply valve 620 in fluid communication with a liquid fuel supply 410 and a liquid fuel injection path 660, a fuel supply valve for the vapor injector 610 in fluid communication with a liquid fuel supply 410 and capillary flow passages 480, and an oxidizing gas supply valve 420 in fluid communication with an oxidizing gas supply 470 and capillary flow passages 480. The control system includes a controller 450, which typically receives a plurality of input signals from a variety of engine sensors such as engine speed sensor 460, intake manifold air thermocouple and pressure sensor 462, coolant temperature sensor 464, exhaust air-fuel ratio sensor 550, fuel supply pressure 412, etc. In operation, the controller 450 executes a control algorithm based on one or more input signals and subsequently generates an output signal 424 to the oxidizer supply valve 420 for cleaning clogged capillary passages in accordance with the invention, an output signal 414 to the liquid fuel supply valve 620, an output signal 434 to the vaporized fuel supply valve 610, and a heating power command 444 to a power supply which delivers power to heat to the capillaries 480.

In operation, the system according to the invention can be configured to feed back heat produced during combustion through the use of exhaust gas recycle heating, such that the liquid fuel is heated sufficiently to substantially vaporize the liquid fuel as it passes through the capillary flow passages 480 reducing or eliminating or supplementing the need to electrically or otherwise heat the capillary flow passages 480.

As may be seen, in the configuration of FIG. 5, the input signals to the engine control unit (ECU) 450, respectively, include fuel supply pressure 412, coolant temperature 464, intake manifold air temperature and pressure 462, engine speed 460, throttle angle 520, and exhaust air/fuel ratio 550. Similarly, the output signals from the ECU 450 are shown to include an air supply command 424, fuel supply commands 414 and 434, a vaporized fuel injection command 452, a liquid fuel injection command 454 and a heating power command 444.

Figure 6:
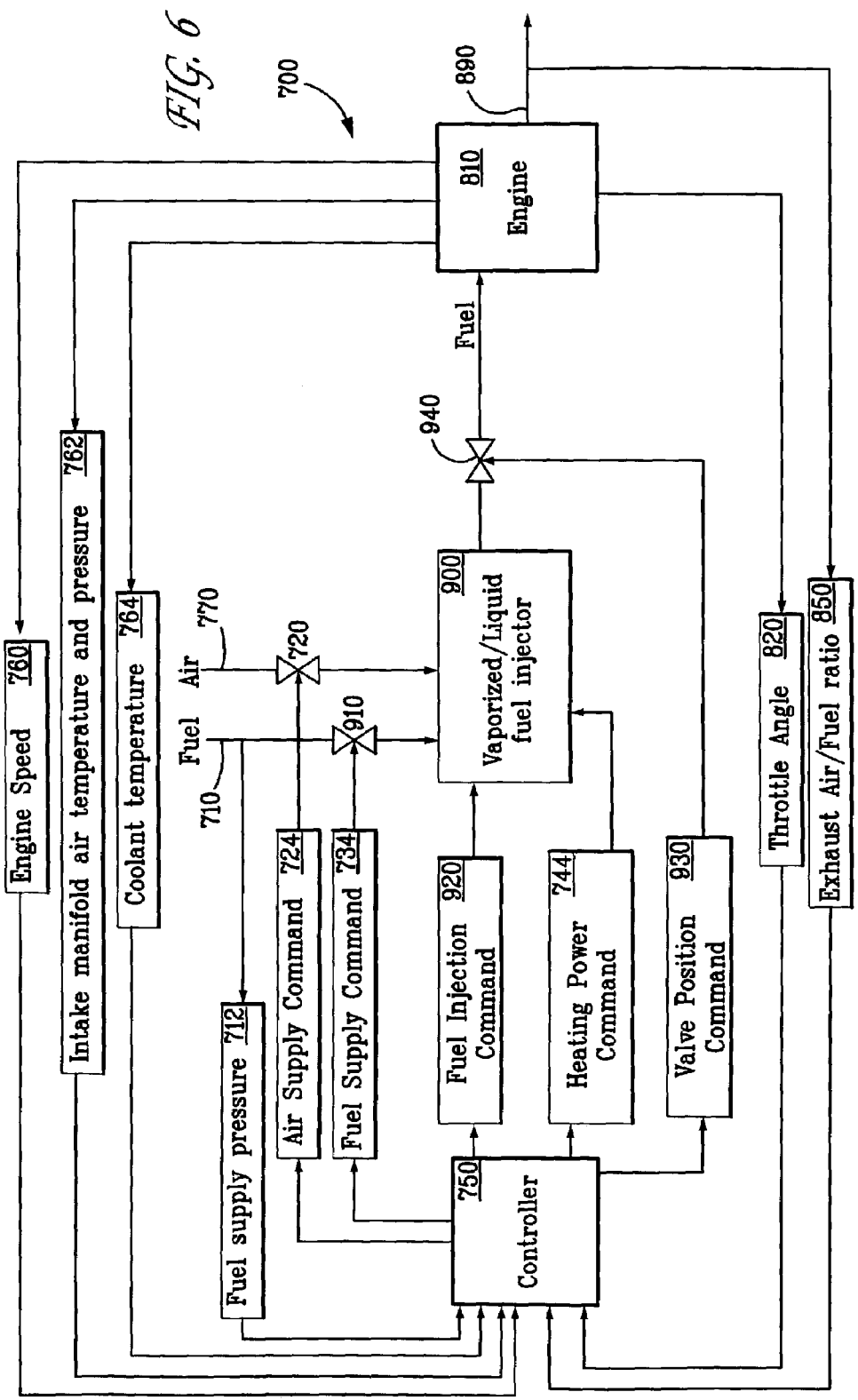
FIG. 6 is a schematic of an engine/controller configuration in which a vapor/liquid fuel injector is used to deliver both vaporized and liquid fuel to the engine, in accordance with still another preferred form.

Alternatively, a fuel injector may be configured such that it accommodates the delivery of both liquid and vapor fuel, as shown in FIG. 2. FIG. 6 shows an exemplary schematic of a control system 700 used to operate an internal combustion engine 810 incorporating a fuel supply valve 940 in fluid communication with a liquid fuel supply 710 and a fuel injection path 900, and an oxidizing gas supply valve 720 in fluid communication with an oxidizing gas supply 770 and capillary flow passages. The control system includes a controller 750 which typically receives a plurality of input signals from a variety of engine sensors such as engine speed sensor 760, intake manifold air thermocouple and pressure sensor 762, coolant temperature sensor 764, exhaust air-fuel ratio sensor 850 and fuel supply pressure 712. In operation, the controller 750 executes a control algorithm based on one or more input signals and subsequently generates an output signal 724 to the oxidizer supply valve 720 for cleaning clogged capillary passages in accordance with one embodiment of the invention, an output signal 930 to the fuel supply valve 940, an output signal 734 to the fuel supply valve 910, and a heating power command 744 to a power supply which delivers power to heat to the capillaries.

Still referring now to FIG. 6, signals to the engine control unit (ECU) 750, respectively, include fuel supply pressure 712, coolant temperature 764, intake manifold air temperature and pressure 762, engine speed 760, throttle angle 820, and exhaust air/fuel ratio 850. Similarly, the output signals from the ECU 750 are an air supply command 724, a fuel supply command 734, a fuel injection command 920 and a heating power command 744. A valve position command control signal 930 is used since the vaporized fuel flow can be pulsed for open valve injection. As may be seen by reference to FIG. 2, fuel and vapor will flow through the same exit path out of the injector. However, the open area required for the flow of liquid fuel is smaller than that required for vapor fuel injection.

As may be appreciated, in each of the embodiments of FIG. 5 and FIG. 6, signals from the engine are sent to the engine controller, which then uses these signals to perform several functions related to the injection of vaporized fuel including determining the type of fuel (liquid or vapor) that should be delivered to the engine for minimal emissions, injecting the appropriate amount of fuel in order to start and warm-up the engine and minimize emissions, controlling the power supplied to the capillary flow passages to achieve a target resistance, which translates into a desired target temperature and phasing over to liquid fuel injection.

Figure 7:
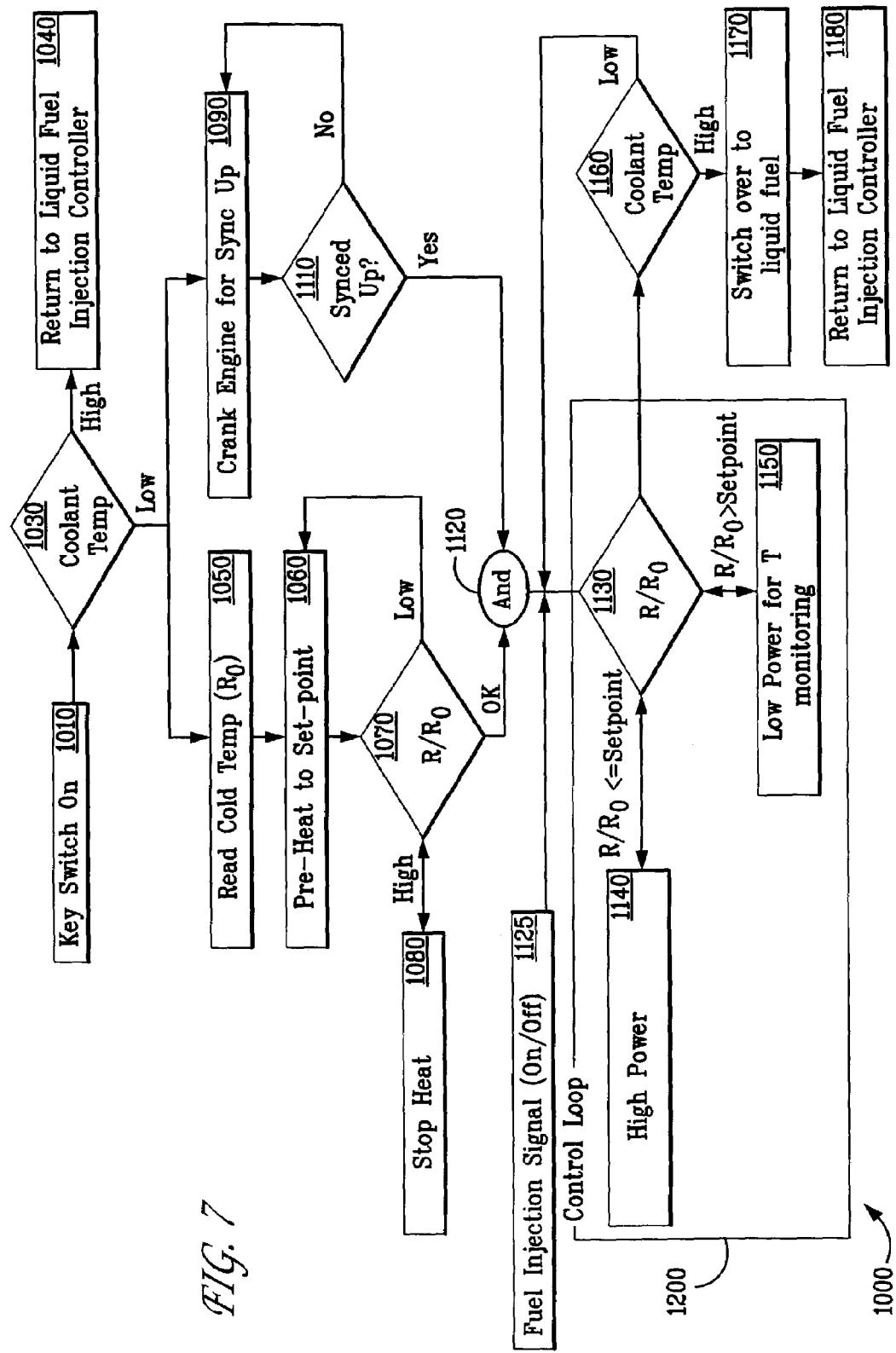
FIG. 7 is a vapor/liquid fuel injector control algorithm in which power to the injector is controlled via a binary (high/low) power source, in accordance with still another preferred form.

An example of a preferred control algorithm is shown schematically in FIG. 7. The fuel injector control algorithm 1000 of FIG. 7 controls power to the injector via a binary (high/low) power source. The control algorithm 1000 is initiated by placing the automobile's key switch in the "on" position 1010. In the determination of the type of fuel (liquid or vapor) to be delivered to the engine, signal 1030, which may be coolant temperature or other signal representative of degree of engine warm-up (e.g., lubricant temperature, intake manifold air temperature or time elapsed from engine start-up) is compared to a set-point. If the coolant, lubricant, or intake manifold air temperature, as the case may be, is greater than or equal to the set-point, the engine controller will specify liquid fuel delivery to the engine 1040. Likewise, if the engine is running and the time elapsed from engine start-up is greater than or equal to a set-point (e.g. 5 minutes), the engine controller will specify liquid fuel delivery to the engine 1040.

Alternatively, if the signal representative of degree of engine warm-up, such as coolant temperature, is below the set-point, the ECU will pre-heat the capillary flow passage 1060 and, optionally, synchronize the engine 1090 for open valve injection through increased cranking time. In the embodiment of FIG. 7, the capillary flow passage preheat temperature is achieved through a basic on/off control loop in which heat is supplied to the capillary until the target temperature 1070 (resistance) is measured. When the temperature reaches the target value 1070, and the engine is still cranking, the heat to the capillary flow passage is removed (1080) for a short period of time to allow the temperature to drop slightly. After this short "off" period, power is again supplied to the capillary flow passage in order to measure the temperature. At this point the control loop is continued.

Once the capillary target temperature 1070 is reached and, optionally, the engine is synchronized for open valve injection 1090, the injector is set to receive the fuel injection command from the ECU. Given the relatively low thermal mass associated with the heated capillary delivery method, this warm-up process is expected to take significantly less than 0.5 seconds and, more preferably on the order of 0.1 seconds. Thus, the rate-limiting step in this phase of injector operation will be the synchronization of the engine 1090, if such a process is included in the engine start-up strategy.

In the injection of the appropriate amount of fuel for cold-start and warm-up of the engine, the amount of liquid fuel that is introduced into the engine during cold-start and warm-up is determined in accordance with the means, represented schematically in FIG. 5 and FIG. 6. Referring again to FIG. 5 and FIG. 6, as may be appreciated, this phase of fuel injection may be governed by an open-loop control algorithm in which the amount of fuel injected is determined through look-up maps based on factors such as engine speed 460 and 760, respectively and accelerator position 520 and 820, respectively. Alternatively, fuel injection may be governed by a feedback control loop in which the exhaust air/fuel ratio signal 550 and 850, respectively are used to determine the injected amount of fuel or a predictive control algorithm governed by the throttle position 520 and 820. In still another embodiment, the throttle position signal 520 and 820, respectively, is passed to the ECU 450 and 750 and a predictive control strategy is used to determine the quantity of fuel required for the given engine conditions.

Referring again to FIG. 7, to ensure that high quality vapor is injected into the engine throughout the cold-start and warm-up period, a technique is provided for controlling the power to the capillary flow passage to maintain a target resistance (i.e., temperature), as the fuel delivery is pulsed and/or the engine fueling requirements change. This is depicted in the "Control Loop" 1200 in FIG. 7. As shown in FIG. 7, the resistance of the capillary flow passage is used as a feedback to determine the appropriate adjustment in power to the capillary flow passage to maintain the target ratio of measured resistance to cold capillary flow passage resistance (R/Ro) 1130.

The embodiment shown in FIG. 7 depicts a step-wise or digital control algorithm where high power 1140 is supplied to heat the capillary if R/Ro 1130 is less than or equal to the set point. Conversely, low power 1150 is supplied to the capillary flow passage when R/Ro 1130 is greater than the set-point. Under such low power conditions the device undergoes convective cooling while resistance is measured and passed back to the controller.

Figure 8:
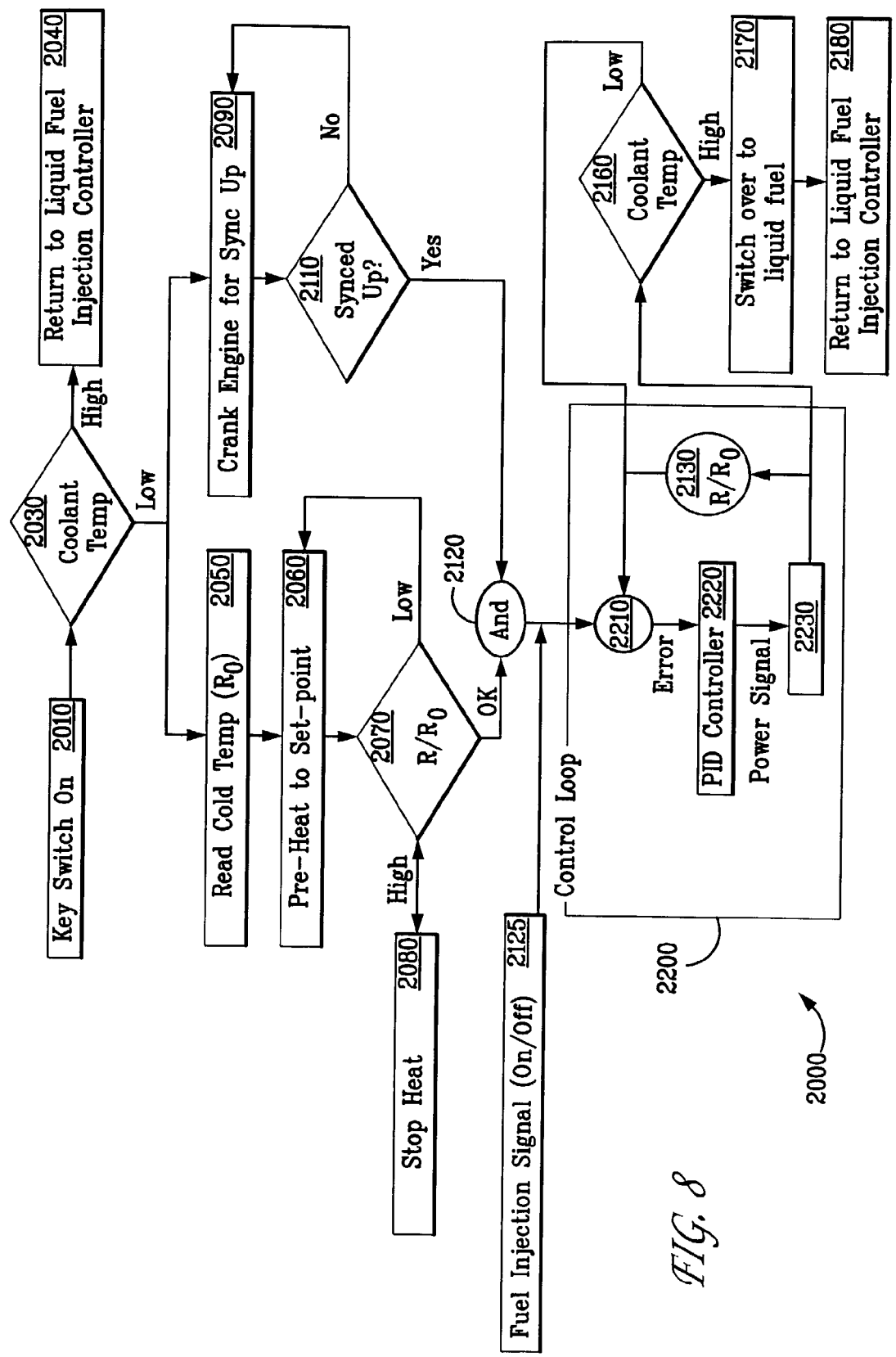
FIG. 8 is a vapor/liquid fuel injector control algorithm in which power to the injector is controlled via a proportional integral derivative controller, in accordance with still another preferred form.

Referring now to FIG. 8, a vapor/liquid fuel injector control algorithm 2000 in which power to the injector is controlled via a proportional integral derivative controller (PID) is shown. PID controllers are available from a wide variety of companies, including West Instrument, LFE, Watlow and Gentran, as well as automotive control suppliers. PID controllers advantageously provide for the accurate maintenance of a control setpoint by adjusting the control outputs. This permits a temperature to be controlled with minimal oscillations around the setpoint.

In the control algorithm of FIG. 8, the control algorithm 2000 begins with positioning the automobile's key switch to the "on" position. The coolant temperature 2030, or other signal representative of degree of engine warm-up (e.g., lubricant temperature, intake manifold air temperature or time elapsed from engine start-up), is compared to a setpoint. If the coolant, lubricant, or intake manifold air temperature, as the case may be, is greater than or equal to the set-point, the engine controller will specify liquid fuel delivery to the engine 2040. Likewise, if the engine is running and the time elapsed from engine start-up is greater than or equal to a set-point (e.g. 5 minutes), the engine controller will specify liquid fuel delivery to the engine 2040.

Alternatively, if the signal representative of degree of engine warm-up, such as coolant temperature, is below the set-point, the ECU will pre-heat the capillary flow passage 2060 and, optionally, synchronize the engine 2090 for open valve injection through increased cranking time. It is important to note that several types of control methodologies including a model-based control can also be used.

Once the capillary target temperature 2060 is reached and, optionally, the engine is synchronized for open valve injection 2090, the injector is set to receive the fuel injection command from the ECU. Again, since this warm-up process is expected to take significantly less than 0.5 seconds and, more preferably on the order of 0.1 seconds, the rate-limiting step will be the synchronization of the engine 2090, if such a process is included in the engine start-up strategy.

Still referring to FIG. 8, to inject the appropriate amount of fuel for cold-start and warm-up of the engine, the amount of liquid fuel that is introduced into the engine during cold-start and warm-up is determined in accordance with the systems represented schematically in FIG. 5 and FIG. 6. Referring again to FIG. 5 and FIG. 6, as may be appreciated, this phase of fuel injection may be governed by an open-loop control algorithm in which the amount of fuel injected is determined through look-up maps based on factors such as engine speed 460 and 760, respectively and accelerator position 520 and 820, respectively. Alternatively, fuel injection may be governed by a feedback control loop in which the exhaust air/fuel ratio signal 550 and 850, respectively are used to determine the injected amount of fuel or a predictive control algorithm governed by the throttle position 520 and 820. In still another embodiment, the throttle position signal 520 and 820, respectively, is passed to the ECU 450 and 750 and a predictive control strategy is used to determine the quantity of fuel required for the given engine conditions.

Referring again to FIG. 8, to ensure that high quality vapor is injected into the engine throughout the cold-start and warm-up period, the present invention specifies a method of controlling the power to the capillary flow passage to maintain a target resistance (i.e., temperature) 2130, as the fuel delivery is pulsed and/or the engine fueling requirements change. This is shown as the "Control Loop" 2200. As shown in FIG. 8, the resistance of the capillary flow passage is used as a feedback to determine the appropriate adjustment in power to the capillary flow passage to maintain the target ratio of measured resistance to cold capillary flow passage resistance (R/Ro) 2130.

The embodiment shown in FIG. 8 depicts an analog control algorithm (a PID controller) where the resistance of the capillary flow passage in the previous time-step is used as the basis for a finite correction to the power supplied to the capillary flow passage in the current time-step. Through such an analog control methodology, the power supplied to the capillary flow passage may span the entire spectrum from zero to the maximum allowable value. However, ideally, the power to the capillary flow passage will be significantly less than the available power such that the control algorithm can effectively respond to sudden changes in engine operating conditions.

As those skilled in the art will readily understand, look-ahead controls are incorporated into the capillary flow passage control algorithm. Specifically, the intake valve actuation signal is incorporated into the control algorithm such that this signal serves as a precursor to the flow of fuel through the one or more capillary flow passages. Upon receiving the intake valve actuation signal, the power to the capillary flow passage is increased such that the capillary flow passage is at sufficient temperature to fully vaporize the fuel flow once the fuel injector is open.

As implied above, the use of an appropriate resistance set-point is critical to the performance of the capillary flow passage-based fuel injector. That is, a low set-point will result in a lack of heat delivered to the fuel which, in turn, will result in poor quality vapor delivered to the engine. Conversely, a high set-point will result in a local hot spot near the end of the capillary such that the temperature of the rest of the capillary is significantly lower than the mean temperature as represented by the resistance of the capillary. Consequently, such a condition results in poor vapor quality as well.

Figure 9:
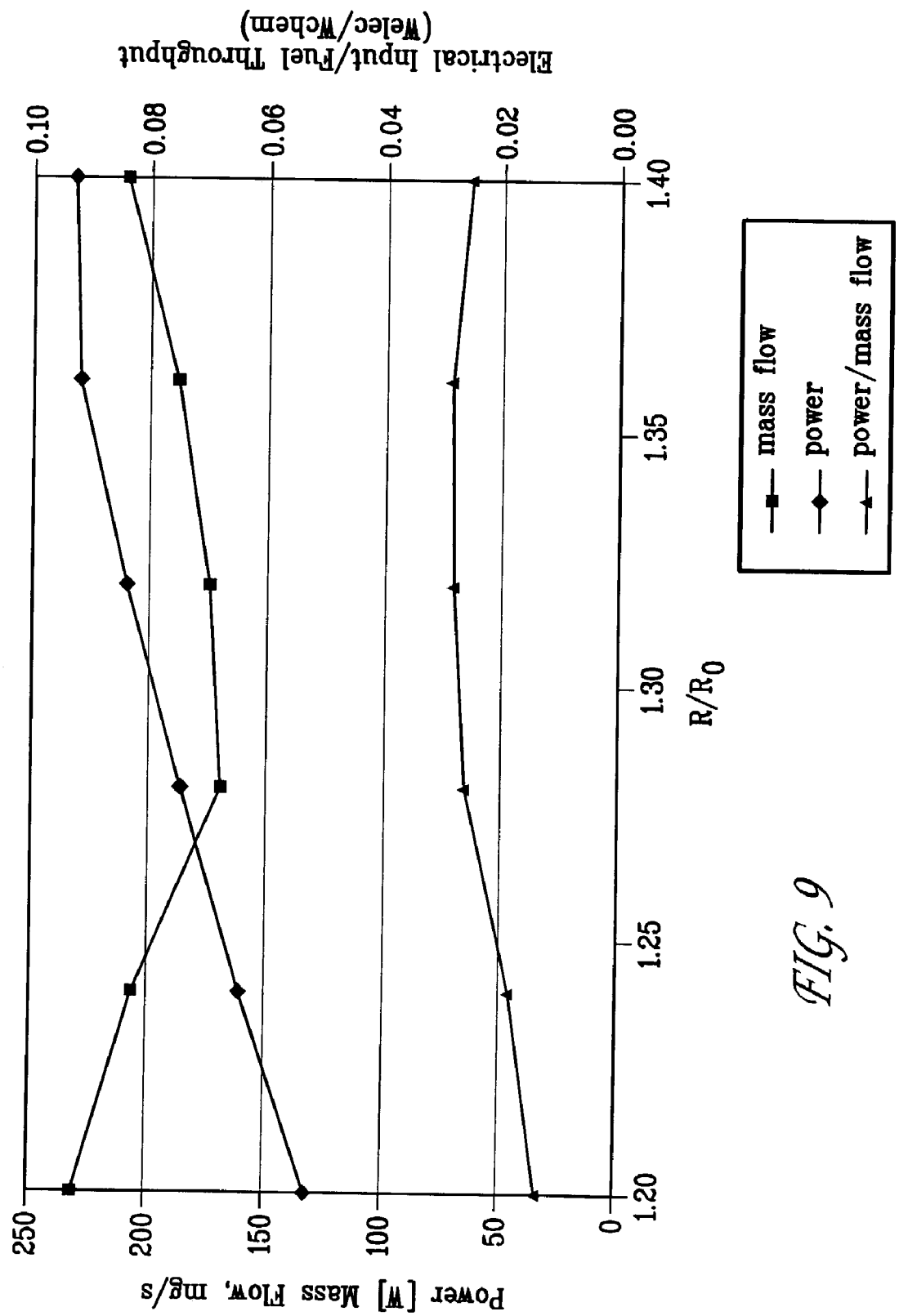
FIG. 9 is an empirically determined resistance set-point for a vapor fuel injector.

Based on these observations, it has been empirically determined that the preferred resistance set-point for a given capillary generally corresponds to the point at which the ratio of power to mass flow through the capillary is maximized. An example of the empirically determined resistance set-point for a capillary passage is shown in FIG. 9. It is important to note that a preferred resistance set-point for a given capillary flow passage is largely insensitive to fuel pressure.

As indicated in FIG. 7 and FIG. 8, in parallel to the control of R/Ro 1130 and 2130, respectively, the coolant temperature 1160 and 2160 is continually compared to the set-point, which signifies fully warm engine conditions. If the coolant temperature is below the respective set-point, heat continues to be supplied to the capillary flow passage via the capillary flow passage control loop 1200 and 2200, respectively, and, thus, high quality fuel vapor continues to be delivered to the engine. Conversely, if the coolant temperature 1160 and 2160 is above the set-point for warm engine operation, the control algorithm begins the phase over to liquid fuel. Alternatively, a timer may be used to determine when the engine reaches fully warm operation, the set point established on the basis of empirical testing.

Referring again to FIG. 5, the process of switching over from vaporized to liquid fuel can take any of several forms and will be a function of the particular capillary flow passage injector configuration employed. In one approach to switching over to liquid fuel, the coolant temperature signal 464 is used to actuate a switching valve 610 and 620 and optionally disable power to the capillary flow passage, which directs the fuel supply away from the capillary flow passage 480 and toward a conventional liquid fuel injection flow passage 660. In practice, this approach will require the fuel injector configuration shown schematically in FIG. 4.

In conjunction with an injector configuration generally depicted in FIG. 6, whereby both vaporized and liquid fuel are delivered to the engine via the same flow passage 900, the coolant temperature signal 764 is used to disable power to the capillary flow passage and actuate 930 a change at the injector exit 940 or a change in the injector duty cycle that will result in less time available for fuel to flow. The orifice size at the injector exit 940 will be a function of the vapor quality exiting the injector. However, given the very low thermal inertia associated with the capillary flow passages disclosed herein used to vaporize fuel, the change over from vapor to liquid fuel injection through the removal of power to the capillary can be approximated as binary in practice.

According to the teachings of the present invention, a methodology for measuring the cold resistance ($R_o$) of the vaporizing capillary channel is now described. This methodology is employed in connection with the overall control strategy for the fuel injector of the present invention and provides the ability to adjust heat control as physical changes occur with respect to the capillary material over the course of time. This fuel injector control strategy is now discussed in connection with FIG. 10, which is a schematic of the overall control process in accordance with the teachings of the present invention.

Figure 10:
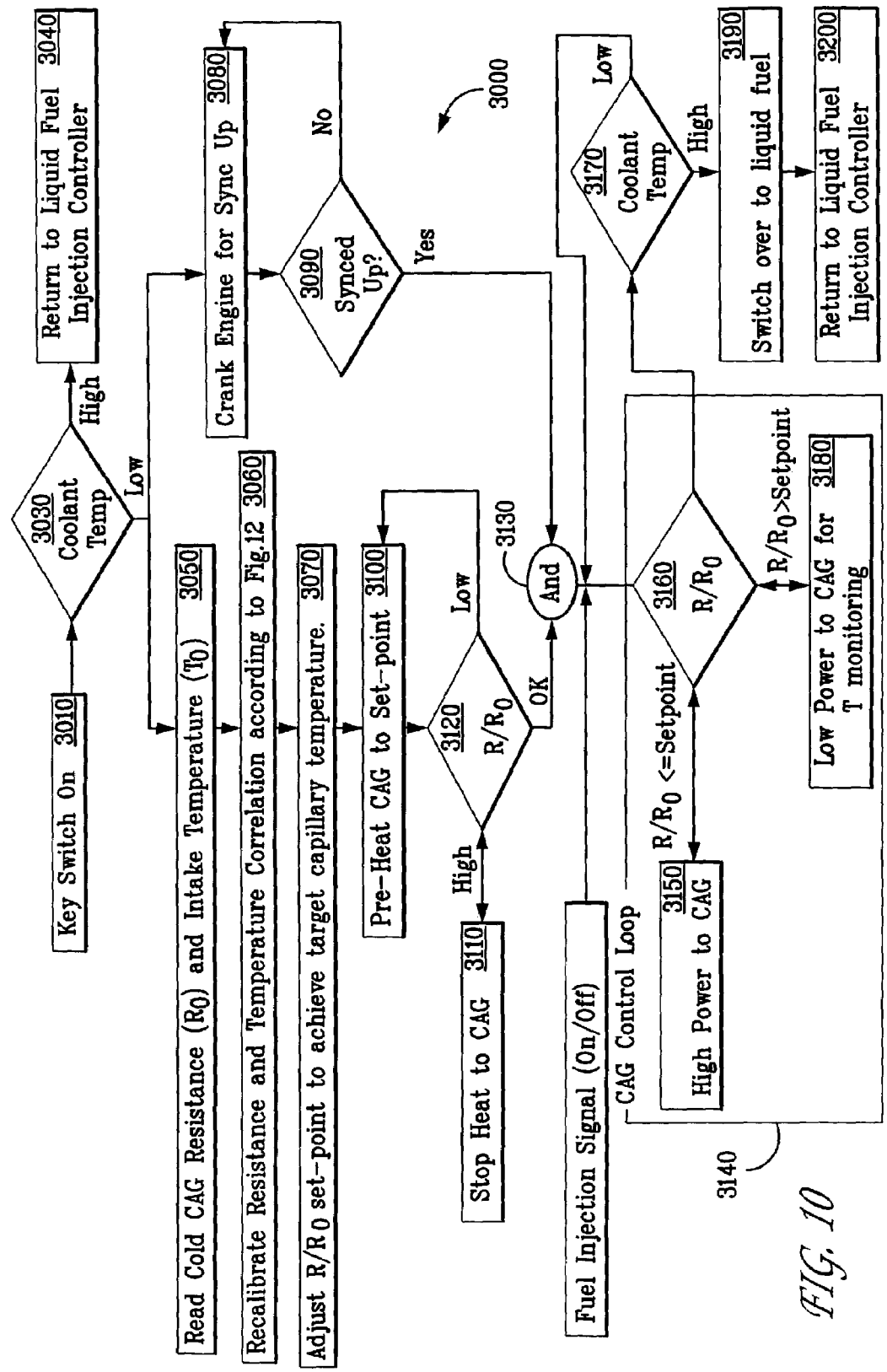
FIG. 10 is a vapor/liquid fuel injector control algorithm according to the teachings of the present invention in which cold recalibration is accomplished.

As can be seen in FIG. 10, the fuel injector control algorithm 3000 of FIG. 10 controls power to the injector via a binary (high/low) power source and also includes the cold recalibration functionality of the present invention. In the determination of the type of fuel (liquid or vapor) to be delivered to the engine, the start control algorithm 3020 begins with the key switch on 3010 of the automobile. At the start of the control algorithm 3000, the signal 3030, which may be coolant temperature or another signal representative of degree of engine warm-up (e.g., lubricant temperature, intake manifold air temperature or time elapsed from engine start-up) is compared to a set-point. If the coolant or lubricant or intake manifold air temperature, as the case may be, is greater than or equal to the set-point, the engine controller will specify liquid fuel delivery to the engine 3040.

Alternatively, if the signal representative of degree of engine warm-up, such as coolant temperature, is below the set-point, the ECU will read the cold CAG resistance ($R_o$) and the intake temperature ($T_o$) 3050. The measured value of $R_o$ combined with the measured value of $T_o$ is then used to adjust the correlation between capillary resistance and the bulk capillary temperature 3060. This sub-process is illustrated by the schematic flowchart of FIG. 12, which is now discussed in detail.

Figure 12:
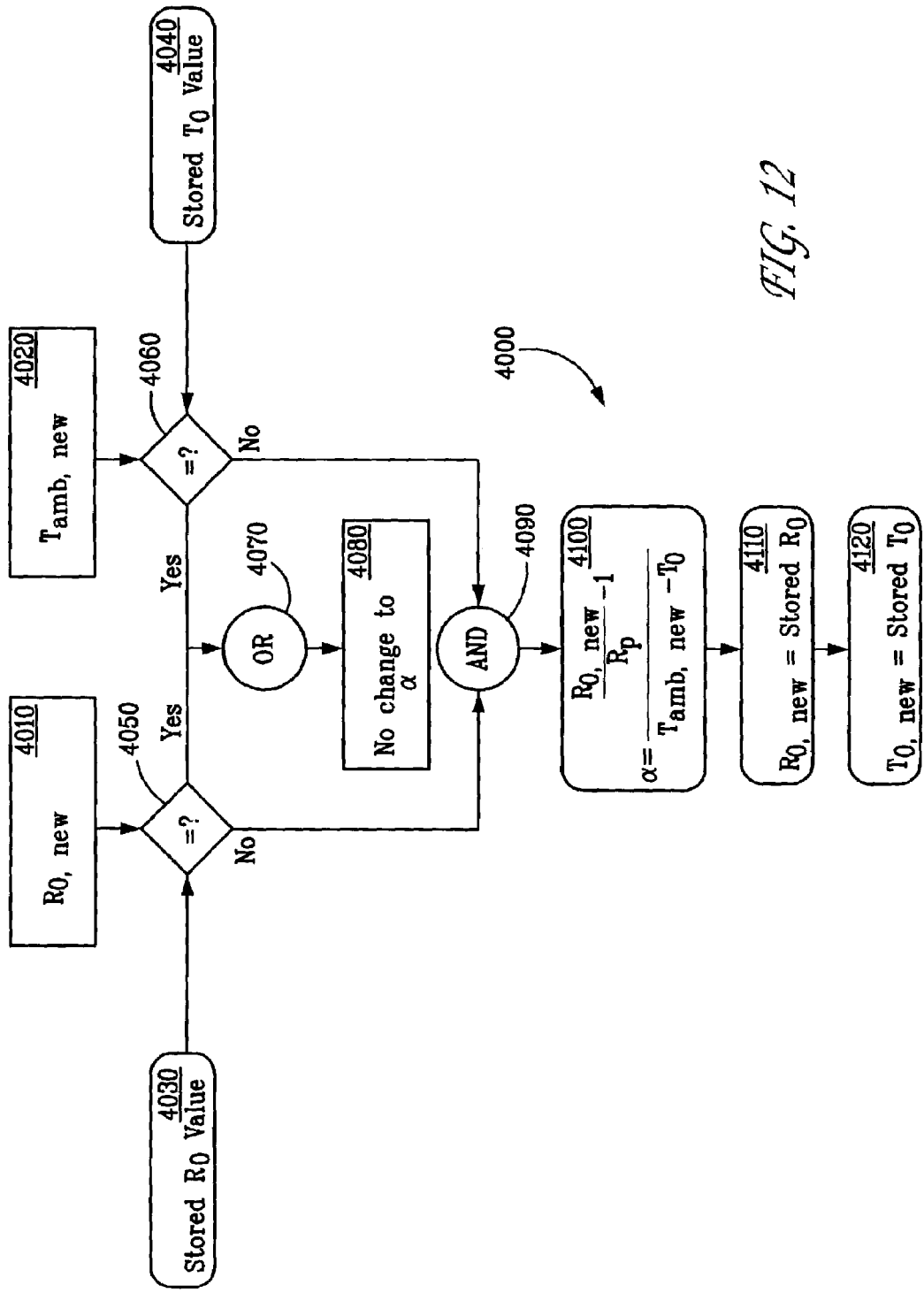
FIG. 12 is a flowchart illustrating the control algorithm associated with changes to $\alpha$, which represents the change in correlation between resistance and temperature in response to physical material changes in the capillary according to the teachings of the present invention.

The primary purpose of the sub-process illustrated in FIG. 12, is to determine the value of α according to the process denoted as 4000. In this context, α represents a variable that accounts for changes in the relationship between resistance and temperature over time as the physical, material properties of the capillary changes over time. As can be seen in FIG. 12, the sub-process begins by first checking whether the previously stored value of $R_o$ equals a newly measured value of $R_o$ 4050 and whether the previously stored value of $T_o$ (ambient temperature) equals a newly measured value of $T_o$ 4060. If either $R_{o,\,new}$ equals the stored $R_o$ value or $T_{amb,\,new}$ equals the stored $T_o$ value, then there is no change to α necessary and the sub-process illustrated in FIG. 12 terminates 4080.

On the other hand, if both $R_o$ and $T_{amb,\,new}$ have changed from their previously stored values 4090, a new α must be calculated. The determination of the new α is based upon the known relationship between resistivity of a conducting material and the temperature of that material over a limited temperature range. This relationship is given as:

$$R = R_o[1 + \alpha(T - T_o)] \quad (1)$$

where R is the resistance of the material at temperature T, $R_o$ is the cold resistance of the material at temperature $T_o$, and α is the temperature coefficient of resistivity of the material. In equation (1), the effect of material properties on the relationship between resistance and temperature is accounted for through α. Therefore, as the capillary material properties change over time, the change in the correlation between resistance and temperature is reflected in a change in α.

Through basic algebraic manipulation, equation (1) above, may be rewritten as follows:

$$\alpha = \frac{\frac{R}{R_o} - 1}{T - T_o} \quad (2)$$

Therefore, in the method of the present invention for cold recalibration of the capillary, the value of α is recalculated upon each start-up cycle as follows:

$$\alpha = \frac{\frac{R_{o,new}}{R_o} - 1}{T_{amb,new} - T_o} \quad (3)$$

where $R_{o,\,new}$ is the measured cold resistance at $T_{amb,\,new}$.

Equation (3) is shown as step 4100 in FIG. 12 as the equation for calculating the new value of α. Following step 4100, at step 4110, the newly measured value of $R_o$ (obtained at step 4010) is stored as the stored $R_o$ value and the newly measured value of $T_o$ (obtained at step 4020) is stored as the stored $T_o$ value. Both of these stored values are available for use during the next iteration of the sub-process of FIG. 12 and upon the next engine start-up.

Figure 11:
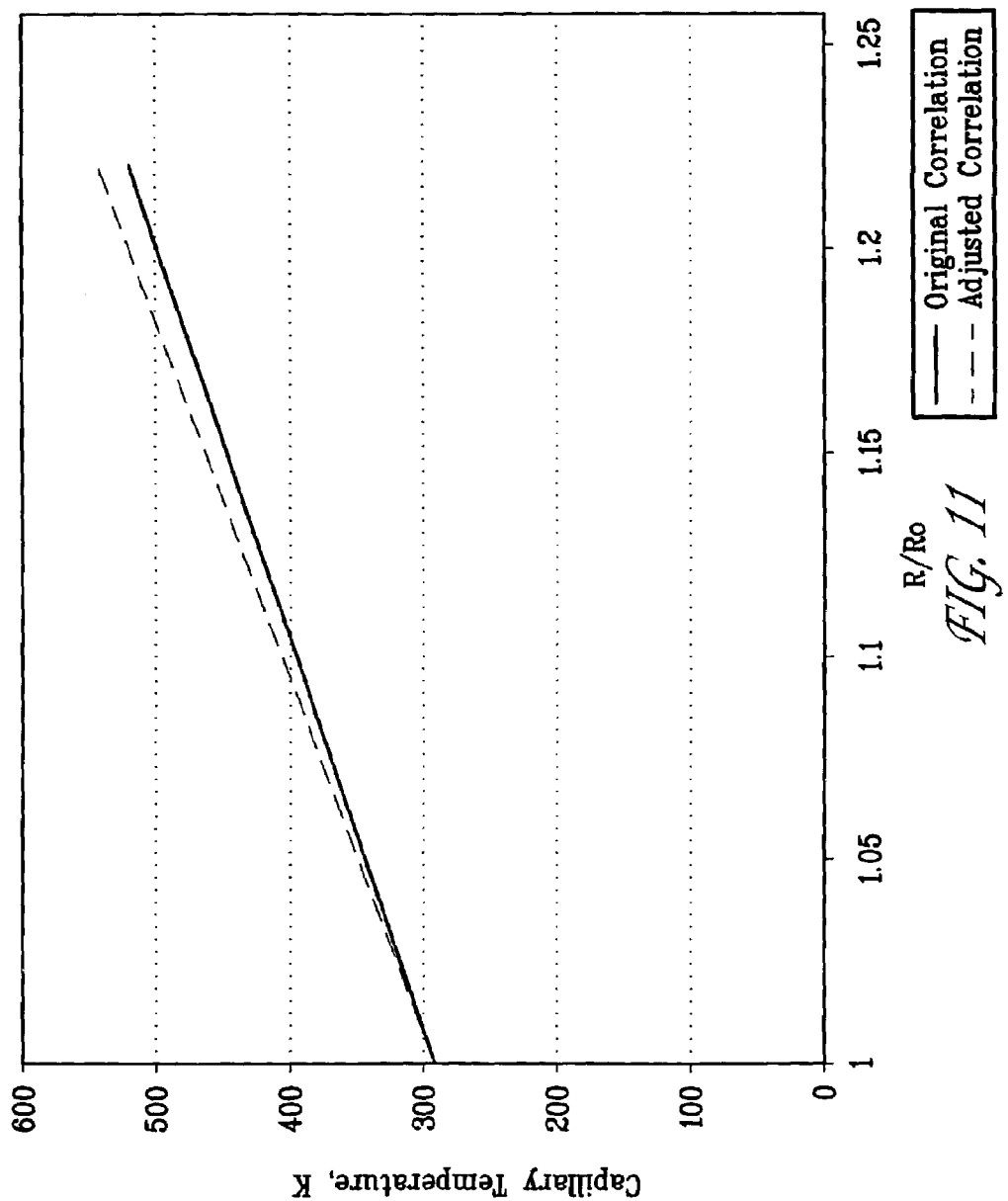
FIG. 11 is a chart showing the shift in the correlation curve between capillary resistance and temperature as a result of the cold recalibration methodology in accordance with the teachings of the present invention.

The newly calculated value of α, as just discussed, represents an adjustment in the actual relationship between capillary resistance and capillary temperature. This adjustment is made so as to shift the correlation curve up or down so that the measured value of $R/R_o=1$ corresponds to the newly measured ambient temperature, $T_o$. This shift in the correlation curve is illustrated in FIG. 11.

Returning now to the overall process illustrated in FIG. 10, and once resistance and temperature correlation has been recalibrated as discussed above, the process proceeds to step 3070 in which the $R/R_o$ set point is adjusted to achieve the desired capillary temperature. The set point is adjusted based upon the most current value of α determined above. Next, the system operates to pre-heat the capillary flow passage 3100 and, optionally, synchronize the engine 3080 for open valve injection through increased cranking time. In the embodiment of FIG. 10, the capillary flow passage preheat temperature is achieved through a basic on/off control loop in which heat is supplied to the capillary until the target temperature 3120 (resistance) is measured. When the temperature reaches the target value 3120, and the engine is still cranking, the heat to the capillary flow passage is removed 3110 for a short period of time to allow the temperature to drop slightly. After this short "off" period, power is again supplied to the capillary flow passage in order to measure the temperature. At this point the control loop is continued.

Once the capillary target temperature 3120 is reached and, optionally, the engine is synchronized for open valve injection 3080, the injector is set to receive the fuel injection command from the ECU. Given the relatively low thermal mass associated with the heated capillary delivery method, this warm-up process is expected to take significantly less than 0.5 seconds and, more preferably on the order of 0.1 seconds. Thus, the rate-limiting step in this phase of injector operation will be the synchronization of the engine 3080, if such a process is included in the engine start-up strategy.

To ensure that high quality vapor is injected into the engine throughout the cold-start and warm-up period, a technique is provided for controlling the power to the capillary flow passage to maintain a target resistance (i.e., temperature), as the fuel delivery is pulsed and/or the engine fueling requirements change. This is depicted in the "Control Loop" 3140 in FIG. 10. As shown in FIG. 10, the resistance of the capillary flow passage is used as a feedback to determine the appropriate adjustment in power to the capillary flow passage to maintain the target ratio of measured resistance to cold capillary flow passage resistance (R/Ro) 3160.

The embodiment shown in FIG. 10 depicts a step-wise or digital control algorithm where high power 3150 is supplied to heat the capillary if R/Ro 3160 is less than or equal to the set point. Conversely, low power 3180 is supplied to the capillary flow passage when R/Ro 3160 is greater than the set-point. Under such low power conditions the device undergoes convective cooling while resistance is measured and passed back to the controller.

As indicated in FIG. 10, in parallel to the control of R/Ro 3160, the coolant temperature 3170 is continually compared to the set-point, which signifies fully warm engine conditions. If the coolant temperature is below the respective set-point, heat continues to be supplied to the capillary flow passage via the capillary flow passage control loop 3140, and, thus, high quality fuel vapor continues to be delivered to the engine. Conversely, if the coolant temperature 3170 is above the set-point for warm engine operation, the control algorithm begins the phase over to liquid fuel 3190.

According to the teachings of the present invention a methodology for fault detection within the fuel delivery system is next discussed. According to this methodology, in addition to serving as a measure of bulk capillary temperature, the measured value of $R/R_o$ may be used in connection with fault detection in the operation of the above discussed capillary heater within the fuel injector. In particular, after the initial start-up period, values of $R/R_o$ that fall outside of a predetermined range are indicative of a fault condition associated with the fuel heating function of the fuel injector of the present invention. Of course, such fault conditions must be distinguished from normal deviations in physical capillary properties observed over time and discussed above.

Figure 13:
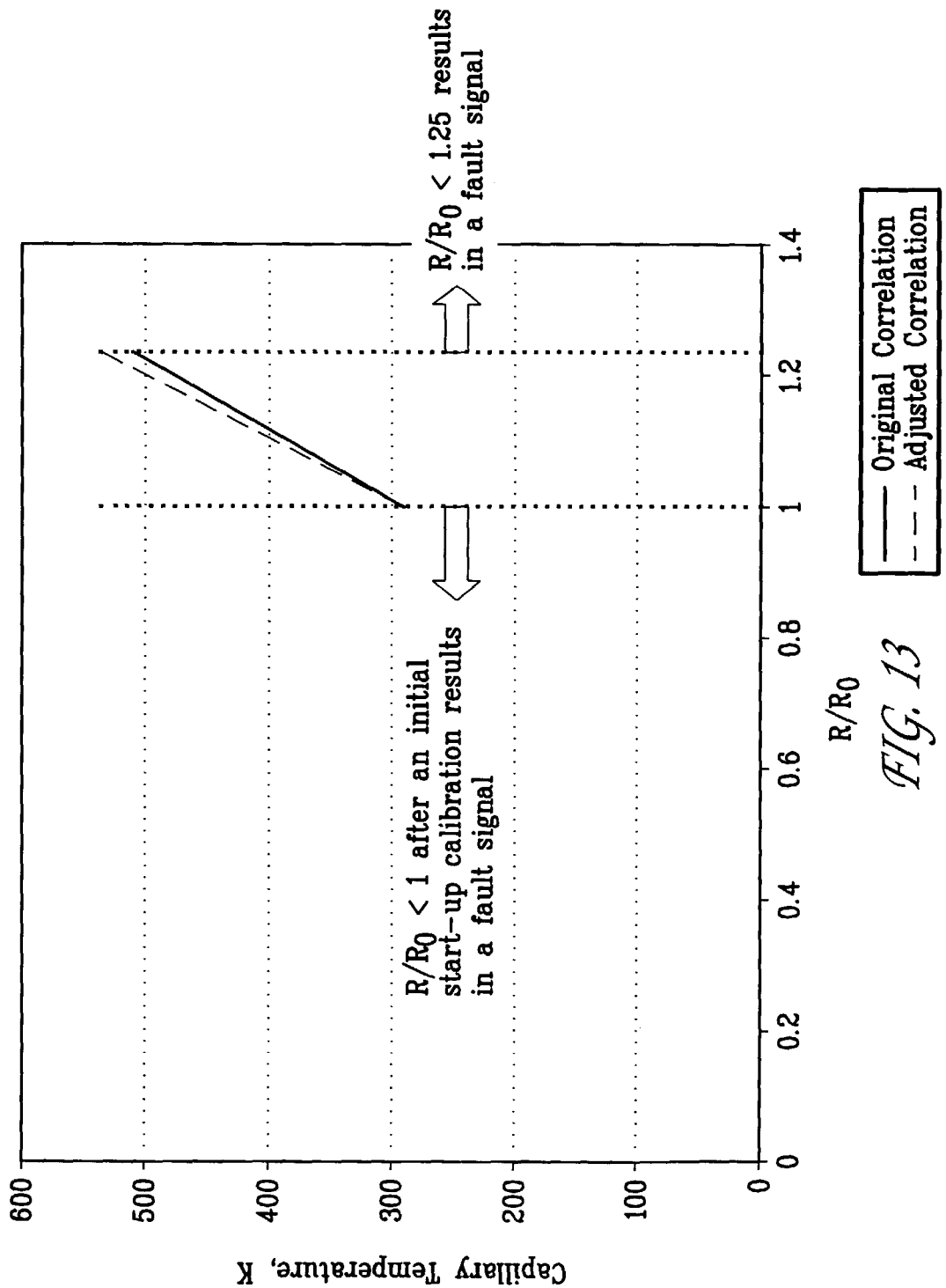
FIG. 13 is a graphical representation of the acceptable ranges of $R/R_o$ during fuel injector operation according to the teachings of the present invention.

Referring now to FIG. 13, a graphical representation of the acceptable ranges of $R/R_o$ in one embodiment of the present invention is presented. FIG. 13 also shows the change in R/Ro as a function of changes to the temperature coefficient of resistivity of the capillary material resulting from normal wear (denoted above as α). Thus, as illustrated in the Figure, the use of $R/R_o$ as a diagnostic metric is based upon setting the $R/R_o$ fault threshold to be well beyond the expected deviations resulting from normal aging and changes resulting from operational use of the capillary channel and associated components. While the "acceptable" range for R/Ro shown in FIG. 13 is between 1 and 1.25, it will be readily understood by one of skill in the art that various other "acceptable" ranges may be selected as the basis for triggering or not triggering a fault detection signal.

In accordance with the present invention, operating conditions with R/Ro values that extend beyond the acceptable fault thresholds may, by way of example, represent injector failures caused by one or more of the following conditions:

(i) current leakage in the external terminal connections (power connections for the heater;

(ii) incorrect resistance feedback for the heater driver controls;

(iii) current leakage through the power wires due to insulation failures;

(iv) component failure of the heater driver power electronics;

(v) component failure of the heater driver controls;

(vi) severe clogging resulting in no or limited fluid flow through the capillary channels;

(vii) hardware failure resulting from incorrectly implemented high set points for the heater driver controls;

(viii) component failure of the heater driver power electronics resulting in a full on condition; or (ix) component failure of the heater driver power electronics resulting in a full off condition.

Figure 14:
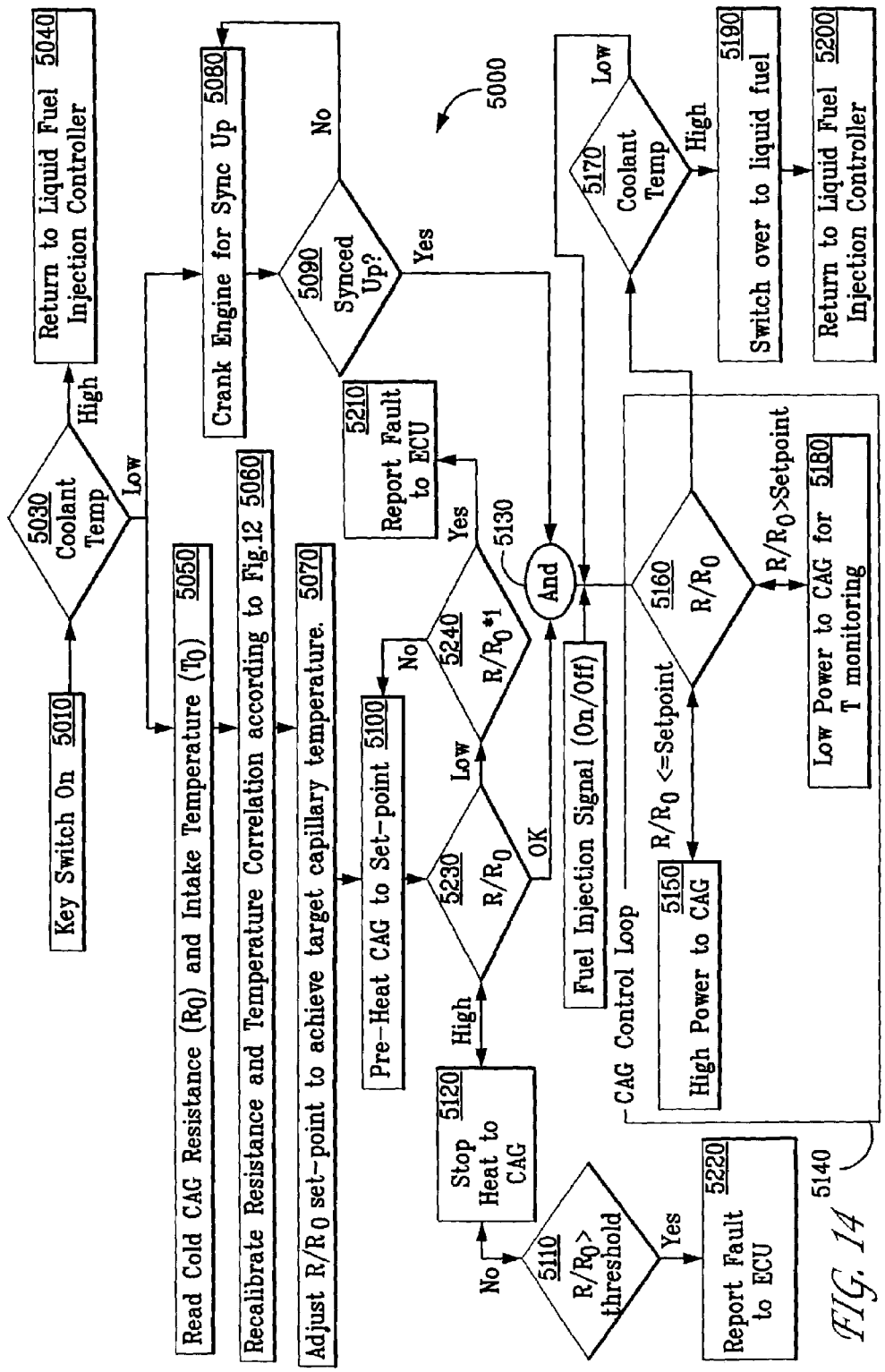
FIG. 14 is a flowchart illustrating the control algorithm associated with fault detection in a capillary channel-based fuel injector using $R/R_o$ in connection with fault detection.

Referring now to FIG. 14, the fuel injector control methodology reflecting the fault detection functionality of the present invention is schematically diagrammed. The methodology according to one preferred embodiment of the present invention is now described. As can be seen in FIG. 14, the fuel injector control algorithm 5000 of FIG. 14 controls power to the injector via a binary (high/low) power source and also includes the cold recalibration functionality of the present invention. In the determination of the type of fuel (liquid or vapor) to be delivered to the engine, the control algorithm 5000 is initiated by placing the automobile's key switch 5010 in the "on" position. At the initiation of the control algorithm 5000, the signal 5030, which may be coolant temperature or another signal representative of degree of engine warm-up (e.g., lubricant temperature, intake manifold air temperature or time elapsed from engine start-up) is compared to a set-point. If the coolant or lubricant or intake manifold air temperature, as the case may be, is greater than or equal to the set-point, the engine controller will specify liquid fuel delivery to the engine 5040.

Alternatively, if the signal representative of degree of engine warm-up, such as coolant temperature, is below the set-point, the ECU will read the cold CAG resistance ($R_o$) and the intake temperature ($T_o$) 5050. The measured value of $R_o$ combined with the measured value of $T_o$ is then used to adjust the correlation between capillary resistance and the bulk capillary temperature 5060. This sub-process was discussed above in connection with FIG. 12.

Once resistance and temperature correlation has been recalibrated as discussed above, the process proceeds to step 5070 in which the $R/R_o$ set point is adjusted to achieve the desired capillary temperature. The set point is adjusted based upon the most current value of α determined above. Next, the system operates to pre-heat the capillary flow passage 5100 and, optionally, synchronize the engine 5080 for open valve injection through increased cranking time. In the embodiment of FIG. 14, a comparison of $R/R_o$ values is made as against upper and lower limits. If $R/R_o$ is higher than the target value 5230, and the engine is still cranking, the heat to the capillary flow passage is removed 5120 for a short period of time to allow the temperature to drop slightly. Further, if $R/R_o$ is greater than a predetermined threshold value 5110 then a fault is reported to the ECU 5220. In the event that $R/R_o$ is below the target value 5230, $R/R_o$ is compared as against a lower predetermined threshold value (such as less than unity as shown in FIG. 14) 5240 and if $R/R_o$ is less than the predetermined value then a fault is reported to the ECU 5210. In either a below threshold fault or an above threshold fault and in connection with the OBD-II system of the vehicle, a fault detection signal may result in the illumination of the "check engine" light in the vehicle.

In an alternative embodiment of the fault detection system of the present invention, the time delay between the key-on signal and reaching the R/Ro target value can also serve as a fault detection metric. As such, if the time to heat the capillary is greater then the maximum predetermined value, than a fault signal may be generated and passed to the ECU. Alternatively, if the time to heat the capillary is less than a minimum threshold value, a fault signal may similarly be passed to the ECU.

Once the capillary target temperature 5230 is reached and, optionally, the engine is synchronized for open valve injection 5080, the injector is set to receive the fuel injection command from the ECU. Given the relatively low thermal mass associated with the heated capillary delivery method, this warm-up process is expected to take significantly less than 0.5 seconds and, more preferably on the order of 0.1 seconds. Thus, the rate-limiting step in this phase of injector operation will be the synchronization of the engine 5080, if such a process is included in the engine start-up strategy.

To ensure that high quality vapor is injected into the engine throughout the cold-start and warm-up period, a technique is provided for controlling the power to the capillary flow passage to maintain a target resistance (i.e., temperature), as the fuel delivery is pulsed and/or the engine fueling requirements change. This is depicted in the "Control Loop" 5140 in FIG. 14. As shown in FIG. 14, the resistance of the capillary flow passage is used as a feedback to determine the appropriate adjustment in power to the capillary flow passage to maintain the target ratio of measured resistance to cold capillary flow passage resistance $(R/R_o)$ 5160.

The embodiment shown in FIG. 14 depicts a step-wise or digital control algorithm where high power 5150 is supplied to heat the capillary if $R/R_o$ 5160 is less than or equal to the set point. Conversely, low power 5180 is supplied to the capillary flow passage when $R/R_o$ 5160 is greater than the set-point. Under such low power conditions the device undergoes convective cooling while resistance is measured and passed back to the controller.

As indicated in FIG. 14, in parallel to the control of R/Ro 5160, the coolant temperature 5170 is continually compared to the set-point, which signifies fully warm engine conditions. If the coolant temperature is below the respective set-point, heat continues to be supplied to the capillary flow passage via the capillary flow passage control loop 5140, and, thus, high quality fuel vapor continues to be delivered to the engine. Conversely, if the coolant temperature 5170 is above the set-point for warm engine operation, the control algorithm begins the phase over to liquid fuel 5190.

While the subject invention has been illustrated and described in detail in the drawings and foregoing description, the disclosed embodiments are illustrative and not restrictive in character. All changes and modifications that come within the scope of the invention are desired to be protected. As an example, a plurality of capillary passages can be provided, with the fuel being passed through the passages in parallel when a higher volume flow rate is desired.

What is claimed is:

1. A method for controlling a fuel system and detecting faults within said fuel system, the fuel system including at least one fuel injector having at least one capillary flow passage, a heat source arranged along the at least one capillary flow passage, the heat source capable of heating the liquid fuel in the at least one capillary flow passage to a level sufficient to convert at least a portion thereof from the liquid state to a vapor state, the method comprising the steps of:
    (a) controlling power supplied to the heat source of the at least one fuel injector to achieve a predetermined target temperature, the predetermined target temperature operable to convert a portion of liquid fuel to the vapor state;
    (b) setting a resistance value for said heat source, the resistance value relatable to the predetermined target temperature;
    (c) determining if said resistance value is outside of a predetermined range;
    (d) if said resistance value is outside of a predetermined range, issuing a fault detection signal; and
    (e) adjusting said resistance value in response to physical changes to said capillary flow passage over time, said adjusting step comprising the sub-steps of: (i) measuring a value indicative of degree of engine warm-up; (ii) in the event that said value indicative of degree of engine warm-up is below a predetermined level then performing the following steps; (iii) measuring the cold resistance value for said capillary flow passage; (iv) measuring the intake ambient temperature; (v) determining if either said measured cold resistance value or said measured intake ambient temperature value matches previously stored measurement for each of said values respectively; and (vi) in the event neither said measured cold resistance value or said measured intake ambient temperature value matches the previously stored measurement for each of said values respectively, then adjusting a resistance value, said resistance value relatable to a predetermined target temperature for said capillary flow passage.

2. The method of claim 1 wherein the lower end of said predetermined range for said resistance value is unity.

3. The method of claim 1 wherein the higher end of said predetermined range is 1.25.

4. The method of claim 1 wherein the fuel system is installed in a vehicle and said fault detection signal causes a vehicle check engine light to illuminate.

5. The method of claim 1 wherein said heat source comprises a binary power source.

6. The method of claim 1 wherein said heat source comprises a proportional integral derivative controller.

7. The method of claim 1 wherein the fuel system is installed in a vehicle and the fault detection signal initiates the step of terminating power supplied to the heat source of the at least one fuel injector until the vehicle is serviced.

* * * * *